US012754710B2

(12) United States Patent
Jia et al.

(10) Patent No.: US 12,754,710 B2
(45) Date of Patent: Oct. 6, 2026

(54) DISPLAY APPARATUS AND METHOD FOR CONTROLLING SCREEN PROJECTIONS FROM MULTIPLE DEVICES TO SAME SCREEN

(71) Applicant: HISENSE VISUAL TECHNOLOGY CO., LTD., Qingdao (CN)

(72) Inventors: Yazhou Jia, Qingdao (CN); Xiaoyan Ma, Qingdao (CN); Jin Liu, Qingdao (CN); Zhikui Wang, Qingdao (CN); Hanyong Wu, Qingdao (CN); Dejin Chu, Qingdao (CN); Anqi Zhang, Qingdao (CN); Yongfang Zhang, Qingdao (CN); Junning Chen, Qingdao (CN); Bin Li, Qingdao (CN); Wenhua Cui, Qingdao (CN); Xiaoxiao Qi, Qingdao (CN); Bingqing Wang, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 397 days.

(21) Appl. No.: 18/384,618

(22) Filed: Oct. 27, 2023

(65) Prior Publication Data

US 2024/0053944 A1 Feb. 15, 2024

Related U.S. Application Data

(63) Continuation of application No. PCT/CN2022/084370, filed on Mar. 31, 2022.

(30) Foreign Application Priority Data

Apr. 30, 2021 (CN) ......................... 202110484270.4
May 27, 2021 (CN) ......................... 202110586572.2
(Continued)

(51) Int. Cl.
*G06F 3/0484* (2022.01)
*G06F 3/0481* (2022.01)
(Continued)

(52) U.S. Cl.
CPC .......... *G06F 3/1454* (2013.01); *G06F 3/0481* (2013.01); *G06F 3/0484* (2013.01); *G06F 9/452* (2018.02); *G06F 2203/04803* (2013.01)

(58) Field of Classification Search
CPC .... G06F 3/1454; G06F 3/0481; G06F 3/0484; G06F 9/452; G06F 2203/04803;
(Continued)

(56) References Cited

U.S. PATENT DOCUMENTS

2001/0006382 A1 7/2001 Sevat
2010/0050081 A1* 2/2010 Lee .................... H04N 21/4316
348/565
(Continued)

FOREIGN PATENT DOCUMENTS

CN 103309555 A 9/2013
CN 103561220 A 2/2014
(Continued)

OTHER PUBLICATIONS

First Office Action in Chinese Patent Application No. 202110702282.X, dated Mar. 1, 2024.
(Continued)

*Primary Examiner* — Rinna Yi
(74) *Attorney, Agent, or Firm* — Meunier Carlin & Curfman LLC

(57) ABSTRACT

Disclosed are a display apparatus and a method for controlling screen projections from multiple devices to a same screen. The display apparatus includes: a display and at least one processor configured to execute instructions to cause the display apparatus to: establish a connection with a first
(Continued)

projection device; receive projection contents; control the display to show a top-level application of a user interface displayed, in a case that the projection content is vertical media resource; determine whether the top-level application supports split screen display; when the top-level application supports split screen display, the top-level application is displayed in a first window and the projection contents are displayed in a second window; when the top-level application does not support split screen display, the top level application after proportional reduction is displayed in either of the two windows, and the projection content are displayed in the other window of the two windows.

14 Claims, 26 Drawing Sheets

(30) Foreign Application Priority Data

Jun. 24, 2021 (CN) ......................... 202110702220.9
Jun. 24, 2021 (CN) ......................... 202110702282.X

(51) Int. Cl.
*G06F 3/14* (2006.01)
*G06F 9/451* (2018.01)

(58) Field of Classification Search
CPC .. G06F 1/1605; G06F 3/04842; G06F 3/0487; G06F 3/0482; G06F 9/451; G09G 2340/0492; G09G 2340/12; G09G 5/14; H04N 21/4363; H04N 21/485
See application file for complete search history.

(56) References Cited

U.S. PATENT DOCUMENTS

| | | | | |
|---|---|---|---|---|
| 2014/0115528 | A1* | 4/2014 | Nagano | G06F 3/0481 715/781 |
| 2022/0408136 | A1 | 12/2022 | Wang | |
| 2023/0245607 | A1* | 8/2023 | Cheon | G09G 5/14 345/173 |

FOREIGN PATENT DOCUMENTS

| | | | |
|---|---|---|---|
| CN | 105005427 | A | 10/2015 |
| CN | 105100907 | A | 11/2015 |
| CN | 106506535 | A | 3/2017 |
| CN | 110032349 | A | 7/2019 |
| CN | 110381197 | A | 10/2019 |
| CN | 111131866 | A | 5/2020 |
| CN | 111277907 | A | 6/2020 |
| CN | 111654727 | A | 9/2020 |
| CN | 111796784 | A | 10/2020 |
| CN | 112423102 | A | 2/2021 |
| CN | 112988102 | A | 6/2021 |
| CN | 114296579 | A | 4/2022 |
| CN | 114296580 | A | 4/2022 |
| WO | 2017034298 | A1 | 2/2017 |
| WO | 2020259015 | A1 | 12/2020 |

OTHER PUBLICATIONS

Notification of the First Office Action, Application No. 202110702220.9, Nov. 23, 2022.
Notification of the Second Office Action, Application No. 202110702220.9, May 7, 2023.
International Search Report, PCT/CN2022/084370, Jun. 17, 2022.
International Search Report, PCT/CN2022/090561, Jul. 7, 2022.

* cited by examiner

DISPLAY APPARATUS AND METHOD FOR CONTROLLING SCREEN PROJECTIONS FROM MULTIPLE DEVICES TO SAME SCREEN

The application is a continuation application of PCT Application No. PCT/CN2022/084370, filed Mar. 31, 2022, which claims priorities to Chinese Patent Application No. 202110484270.4 filed on Apr. 30, 2021, No. 202110702220.9 filed on Jun. 24, 2021, No. 202110702282.X filed on Jun. 24, 2021, No. 202110586572.2 filed on May 27, 2021, the entire contents of which are incorporated herein by reference.

TECHNICAL FIELD

The display application relates to display apparatus technology, in particular to a display apparatus and a method for controlling screen projections from multiple devices to a same screen.

BACKGROUND

A currently displayed a content on a screen of a mobile device may be displayed on a user interface of a display apparatus based on a certain projection protocol, where the content output by the mobile device includes various media information and real-time operation images, etc. Due to the fact that the current display apparatus can only allow one mobile device to projection at a same time, that is, the user interface can only display the content on the screen of one mobile device, and cannot display projections of multiple mobile devices on a same screen.

SUMMARY

Some embodiments of the present application provide a display apparatus, including: a display, configured to display images and/or a user interface, where the user interface includes one or more windows; and at least one processor, connected with the display, and configured to execute instructions to cause the display apparatus to: establish a connection with a first projection device in response to a first projection request from the first projection device; receive projection content from the first projection device; based on determining projection content from the first projection device is vertical media resource, control the display to show a top-level application of a user interface displayed when the first projection request is received and the projection contents from the first projection device; based on determining the top-level application supports split screen display, display two windows on the display, where the top-level application is displayed in a first window of the two windows, and the projection content from the first projection device is displayed in a second window of the two windows; based on determining the top-level application does not support split screen display, display two windows on the display, where the top level application after scaling is displayed in either window of the two windows, and the projection content from the first projection device is displayed in the other window of the two windows.

In some embodiments, the at least one processor is further configured to execute the instructions to cause the display apparatus to: establish connections with multiple projection devices in response to multiple projection requests from the multiple projection devices, where the multiple projection devices support a same projection protocol, and the multiple projection devices are connected with the display apparatus at different time points; receive projection contents sent from the multiple projection devices; based on determining the projection contents from a second projection device is vertical media resource, control multiple windows to display the projection contents sent from the multiple projection devices respectively, where the second projection device is connected with the display apparatus later than one or more other projection devices among the multiple projection devices; and based on determining the projection content sent from the second projection device is a horizontal media resource, control the display to display the projection contents sent from the second projection device in full screen.

In some embodiments, the at least one processor is further configured to execute the instructions to cause the display apparatus to: based on determining the display includes one window, display the projection content from the second projection device in full screen.

In some embodiments, in a case where the display apparatus establishes the connections with the multiple projection devices, the at least one processor is further configured to execute the instructions to cause the display apparatus to: receive multiple projection requests from the multiple projection devices through a same projection service in the display apparatus; in response to the multiple projection requests, monitor the connections of the projection devices by using the projection service, and perform group management on the multiple projection devices, where different projection devices are different members in a group; and create instruction channels and data channels between the multiple projection devices and the members in the group, where the instruction channels are configured for instruction interactions between the multiple projection devices and the display apparatus, and the data channels are configured for data interactions between the multiple projection devices and the display apparatus.

In some embodiments, the at least one processor is further configured to execute the instructions to cause the display apparatus to: associate the multiple projection devices with multiple device identifiers; where a projection device has a unique device identifier in the group.

In some embodiments, in a case where the multiple windows display the projection contents sent from the multiple projection devices respectively, the at least one processor is further configured to execute the instructions to cause the display apparatus to: based on determining the display content of the top-level application is retained, control the multiple windows to display a display content of the top-level application and the projection contents sent from the multiple projection devices respectively; and based on determining the display content of the top-level application is not retained, control the multiple windows to display the projection contents sent from the multiple projection devices respectively.

In some embodiments, the at least one processor is further configured to execute the instructions to cause the display apparatus to: based on determining the top-level application supports split-screen displaying, activate a corresponding number of windows, and push the top-level application and the projection contents from the multiple projection devices respectively to the corresponding number of windows through an activity manager; and based on determining the top-level application does not support split-screen displaying, activate a corresponding number of windows, and push a proportionally reduced user interface of the top-level application and the projection contents sent from the multiple projection devices respectively to the corresponding number of windows through an activity manager.

In some embodiments, in a case where the multiple windows display the projection contents of the multiple projection devices respectively, the at least one processor is further configured to execute the instructions to cause the display apparatus to: receive an selection operation on a media resource control in one of the multiple windows, where the media resource control is configured to display a corresponding multimedia resource; and display the corresponding multimedia resource in the window to which the media resource control belongs in full screen according to the selection operation, in a case where the corresponding multimedia resource is a horizontal media resource.

Some embodiments of the present application provide a method for display apparatus. The method includes: establishing a connection with a first projection device in response to a first projection request from the first projection device; receiving projection content from the first projection device; based on determining projection content from the first projection device is vertical media resource, controlling the display to show a top-level application of a user interface displayed when the first projection request is received and the projection contents from the first projection device; based on determining the top-level application supports split screen display, displaying two windows on the display, where the top-level application is displayed in a first window of the two windows, and the projection content from the first projection device is displayed in a second window of the two windows; based on determining the top-level application does not support split screen display, displaying two windows on the display, where the top level application after scaling is displayed in either window of the two windows, and the projection content from the first projection device is displayed in the other window of the two windows.

In some embodiments, the method further includes: establishing connections with multiple projection devices in response to multiple projection requests from the multiple projection devices, where the multiple projection devices support a same projection protocol, and the multiple projection devices are connected with the display apparatus at different time points; receiving projection contents sent from the multiple projection devices; based on determining the projection contents from a second projection device is vertical media resource, controlling multiple windows to display the projection contents sent from the multiple projection devices respectively, where the second projection device is connected with the display apparatus later than one or more other projection devices among the multiple projection devices; and based on determining the projection content sent from the second projection device is a horizontal media resource, controlling the display to display the projection contents sent from the second projection device in full screen.

In some embodiments, the method further includes: based on determining the display includes one window, displaying the projection content from the second projection device in full screen.

In some embodiments, the method further includes: receiving multiple projection requests from the multiple projection devices through a same projection service in the display apparatus; in response to the multiple projection requests, monitoring the connections of the projection devices by using the projection service, and perform group management on the multiple projection devices, where different projection devices are different members in a group; and creating instruction channels and data channels between the multiple projection devices and the members in the group, where the instruction channels are configured for instruction interactions between the multiple projection devices and the display apparatus, and the data channels are configured for data interactions between the multiple projection devices and the display apparatus.

In some embodiments, the method further includes: associating the multiple projection devices with multiple device identifiers; where a projection device has a unique device identifier in the group.

In some embodiments, the method further includes: based on determining the display content of the top-level application is retained, controlling the multiple windows to display a display content of the top-level application and the projection contents sent from the multiple projection devices respectively; and based on determining the display content of the top-level application is not retained, controlling the multiple windows to display the projection contents sent from the multiple projection devices respectively.

In some embodiments, the method further includes: based on determining the top-level application supports split-screen displaying, activating a corresponding number of windows, and pushing the top-level application and the projection contents from the multiple projection devices respectively to the corresponding number of windows through an activity manager; and based on determining the top-level application does not support split-screen displaying, activating a corresponding number of windows, and pushing a proportionally reduced user interface of the top-level application and the projection contents sent from the multiple projection devices respectively to the corresponding number of windows through an activity manager.

In some embodiments, the method further includes: receiving an selection operation on a media resource control in one of the multiple windows, where the media resource control is configured to display a corresponding multimedia resource; and displaying the corresponding multimedia resource in the window to which the media resource control belongs in full screen according to the selection operation, in a case where the corresponding multimedia resource is a horizontal media resource.

DETAILED DESCRIPTION

In order to make the objectives, implementations and advantages of the present application clearer, the exemplary embodiments of the present application will be described clearly and completely below with reference to the accompanying drawings in the exemplary embodiments of the present application. Obviously, the exemplary embodiments described are only a part of the embodiments of the present application, but not all of the embodiments.

Figure 1:
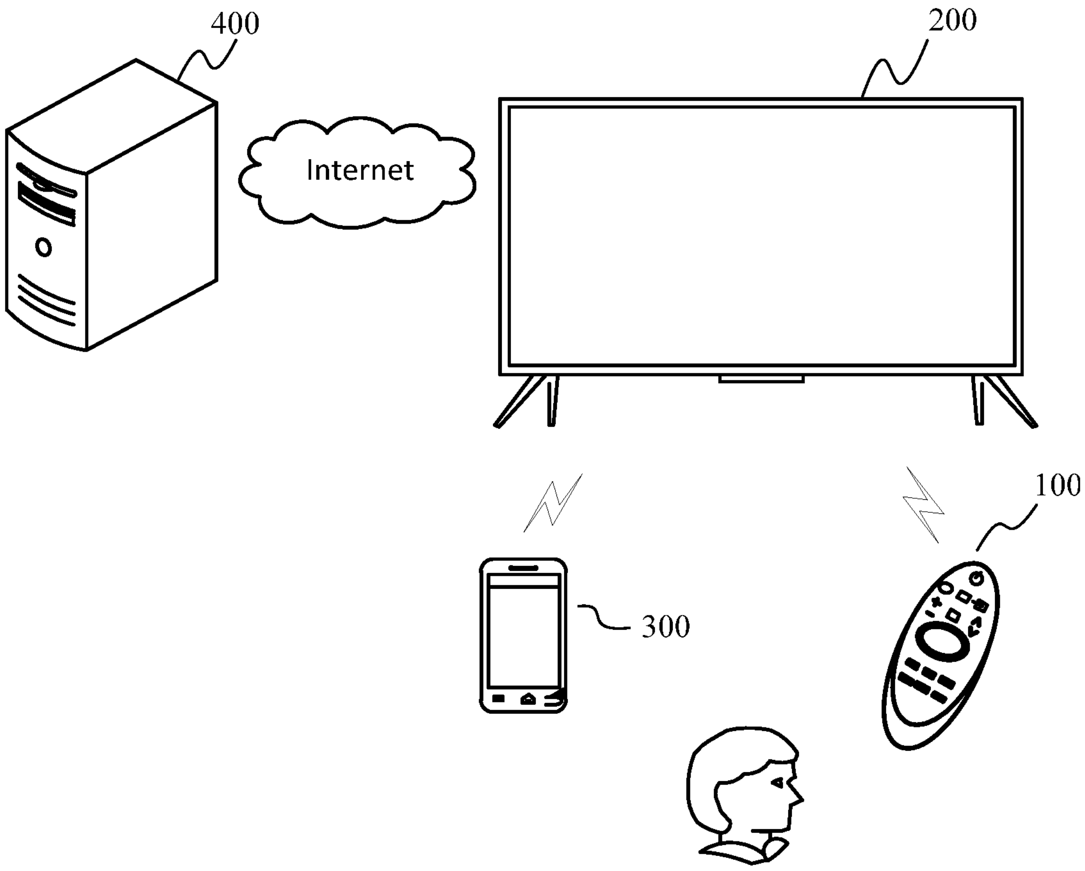
FIG. 1 is a schematic diagram of an operation scenario between a display apparatus and a control device according to some embodiments.

FIG. 1 is a schematic diagram of an operation scenario between a display apparatus and a control device according to embodiments. As shown in FIG. 1, a user may operate the display apparatus 200 through the smart device 300 or the control device 100. In some embodiments, the control device 100 may be a remote control device, a communication between the remote control device and the display apparatus includes infrared protocol communication or Bluetooth protocol communication, or other short-range communication methods, for example, the display apparatus 200 may be controlled wirelessly or wiredly by the control device 100. The user may control the display apparatus 200 by inputting commands through keys on the remote control device, voice input, control panel input, or the like. In some embodiments, a smart device 300 (e.g., a mobile terminal, a tablet computer, a computer, a notebook computer, etc.) may also be used to control the display apparatus 200. For example, the display apparatus 200 is controlled by using an application running on the smart device. In some embodiments, the display apparatus 200 may also be controlled in a manner other than the control device 100 and the smart device 300, e.g., the display apparatus 200 may be controlled by directly receiving a user's voice command through a module for acquiring a voice command configured inside the display apparatus 200, or may be controlled by receiving a user's voice command through a voice controller provided outside the display apparatus 200. In some embodiments, the display apparatus 200 is also in data communication with the server 400. The display apparatus 200 may be allowed to communicate with other networks via a local area network (LAN) or wireless local area network (WLAN). The server 400 may provide various contents and interactions to the display apparatus 200. The server 400 may be a cluster or multiple clusters, and may include one or more types of servers.

Figure 2:
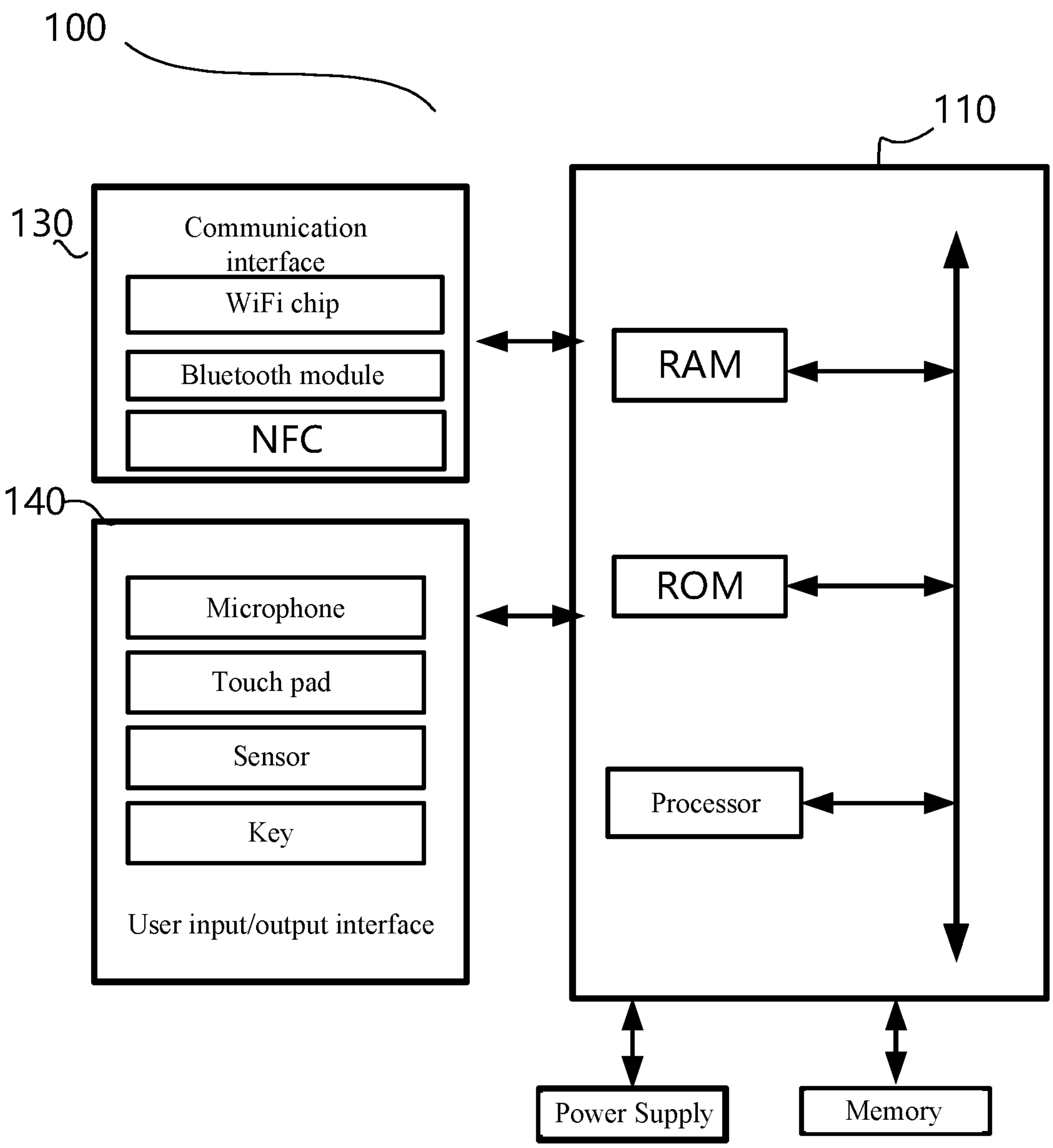
FIG. 2 is a block diagram of a hardware configuration of a control device 100 according to some embodiments.

FIG. 2 shows a configuration block diagram of the control device 100 according to embodiments. As shown in FIG. 2, the control device 100 includes a processor 110, a communication interface 130, a user input/output interface 140, a memory, and a power supply. The control device 100 can receive an operation command input from the user, and convert the operation command into an instruction that the display apparatus 200 can recognize and respond to, and play an intermediary role between the user and the display apparatus 200.

Figure 3:
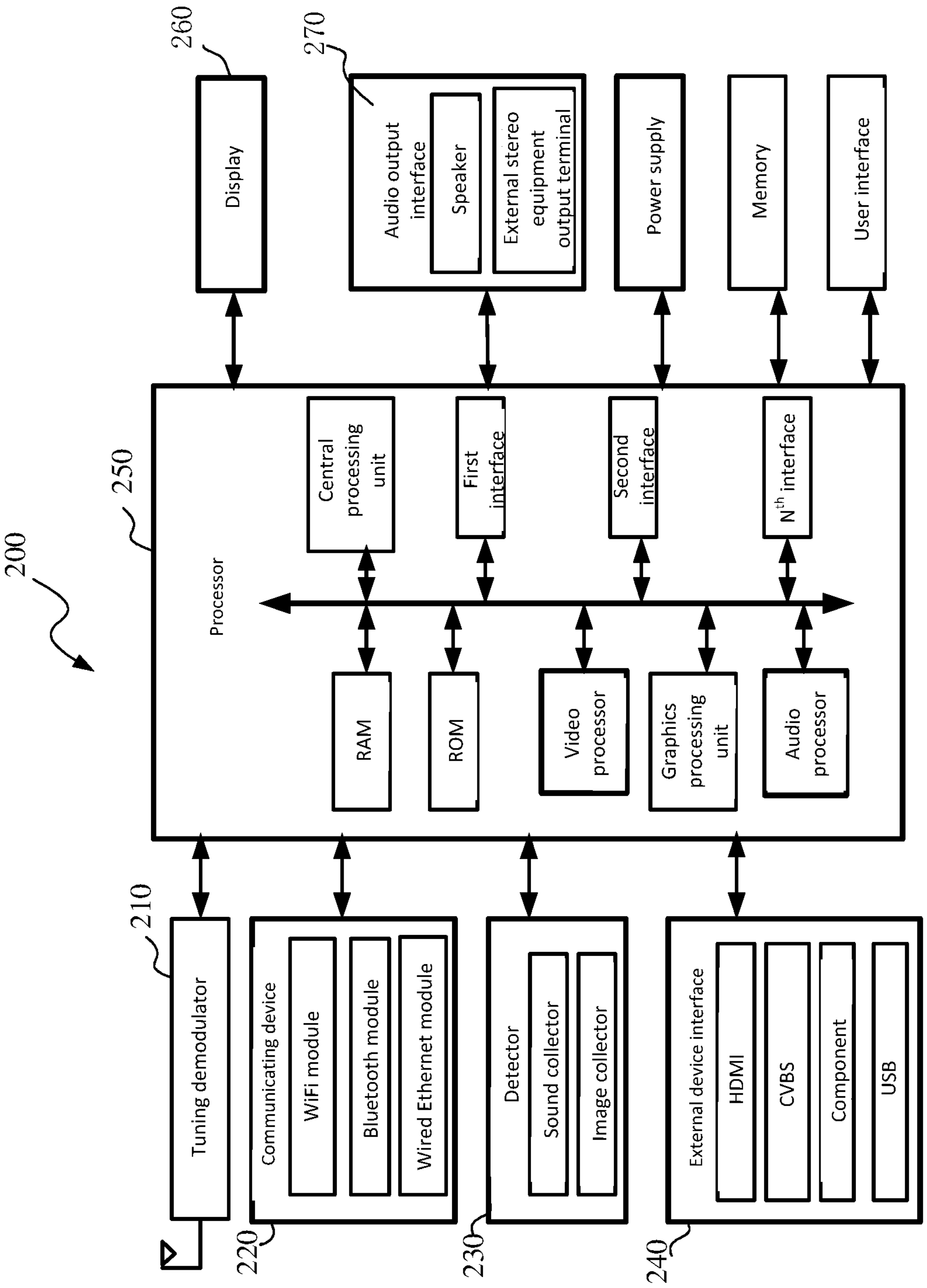
FIG. 3 is a block diagram of a hardware configuration of a display apparatus 200 according to some embodiments.

FIG. 3 is a block diagram showing a hardware configuration of the display apparatus 200 according to embodiments. As shown in FIG. 3, in some embodiments, the display apparatus 200 includes at least one of a tuner demodulator 210, a communicating device 220, a detector 230, an external device interface 240, a processor 250, a display 260, an audio output interface 270, a memory, a power supply, or a user interface. In some embodiments, the display 260 includes a panel component for displaying an image, an image display driver component for receiving an image signal output from the processor, displaying a video content and an image content, a menu operation interface component and user interface (UI) for user operation. The display 260 may be a liquid crystal display, an OLED display, and a projection display, and may also be a projection device and a projection screen. In some embodiments, the processor 250 may include multiple processors, and through various software control programs stored on the memory, controls the operation of the display apparatus and responds to the user's operations. The processor 250 controls an overall operation of the display apparatus 200. For example, in response to receiving a user instruction for selecting a UI object to be displayed on the display 260, the processor 250 may perform an operation related to the object selected by the user instruction. In some embodiments, the object may be any of the selectable objects, such as a hyperlink, an icon, or other operable controls. The operation related to the selected object includes: an operation of displaying a page, a document, an image, etc., pointing to the hyperlinked, or an operation of launching an application corresponding to the icon.

Figure 4:
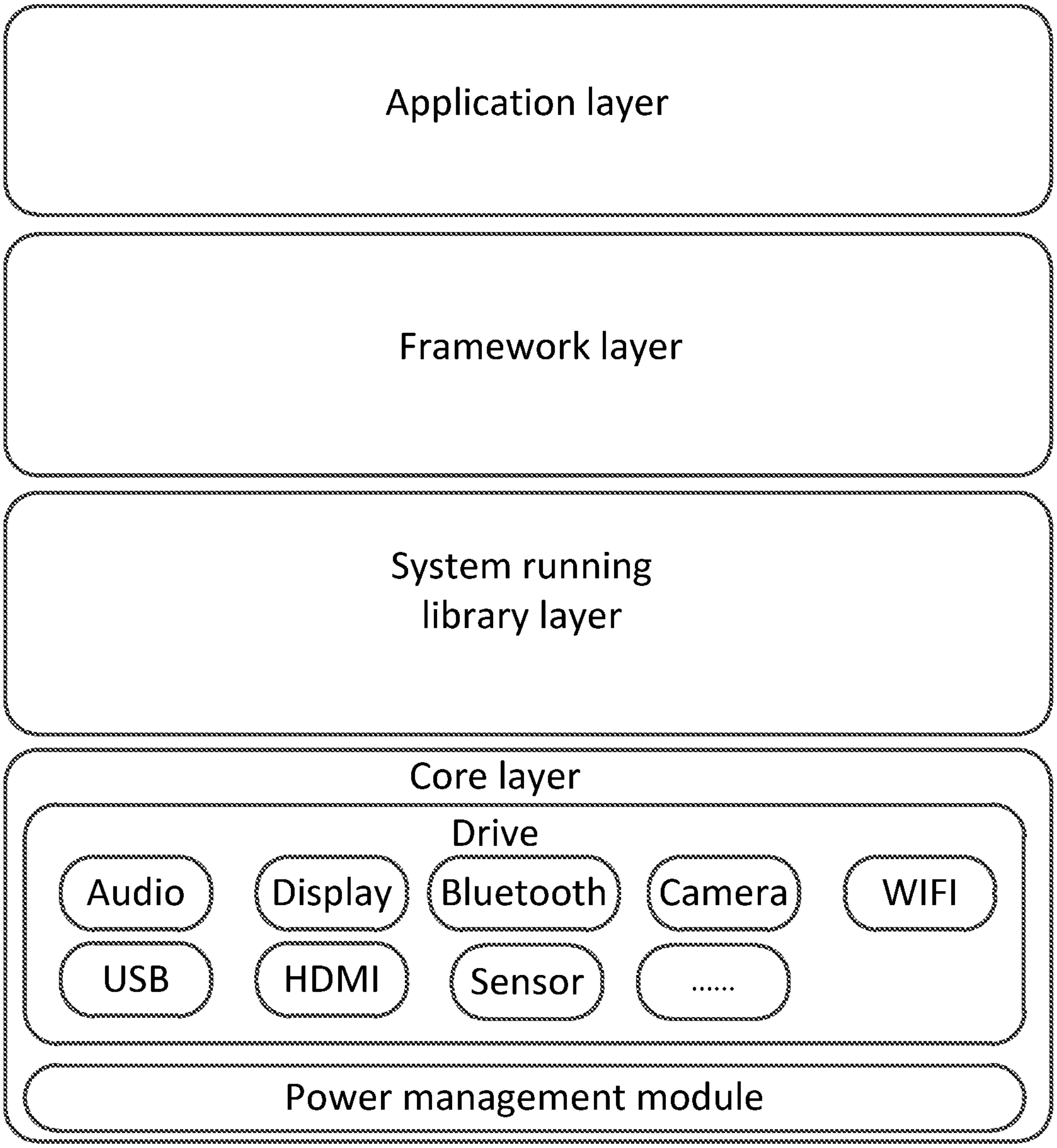
FIG. 4 is a schematic diagram of software configuration in a display apparatus 200 according to some embodiments.

FIG. 4 is a schematic diagram of software configuration in the display apparatus 200 according to some embodiments. Referring to FIG. 4, in some embodiments, the system is divided into four layers, from top to bottom are a layer of applications (referred to as "application layer"), the Application Framework layer (referred to as the "framework layer"), the Android runtime and the system library layer (referred to as the "system runtime library layer"), and the kernel layer. In some embodiments, at least one application runs in the application layer, and the application may be a window (Window) application, a system setting application, or a clock application built in the operating system; and the framework layer provides an application programming interface for the applications. The application framework layer includes some predefined functions. The kernel layer is the layer between hardware and software. The kernel layer includes at least one of the following drivers: audio driver, display driver, or Bluetooth driver, etc.

<Split Screen Mode>

Based on the above-mentioned display apparatus 200, the user may perform split-screen processing on a displayed image during the use of the display apparatus 200, that is, when the display apparatus 200 enters the split-screen mode, the display 260 forms multiple windows. In the split-screen mode, the display 260 of the display apparatus 200 can simultaneously display two or more windows on the user interface, and each window can independently display different contents, so that the user can watch images of different programs at the same time.

Figure 5A:
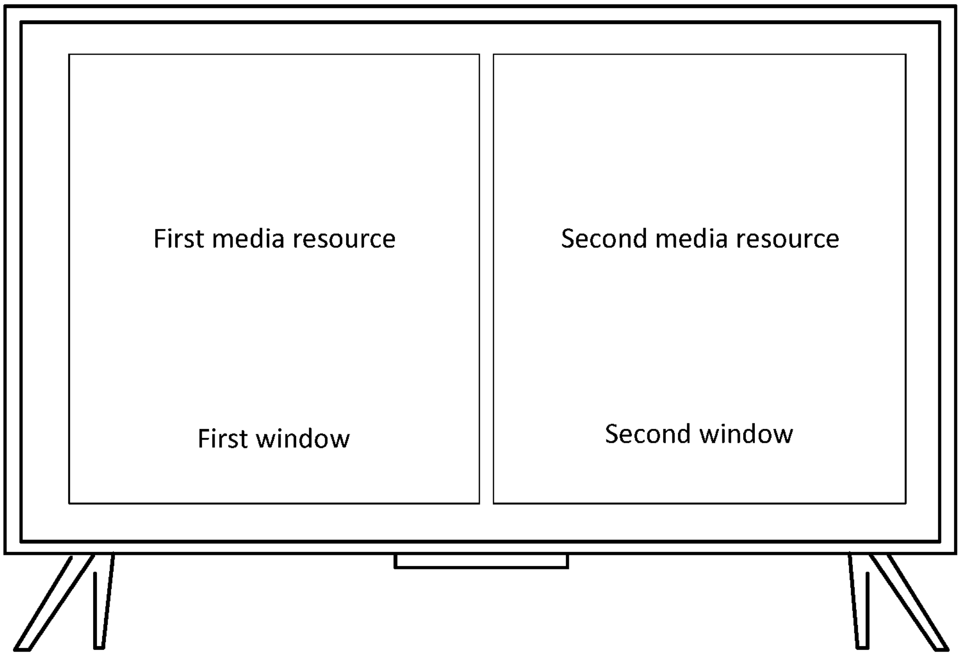
FIG. 5A is a schematic diagram of a display effect of a two-split screen in a split-screen mode according to some embodiments.
Figure 5B:
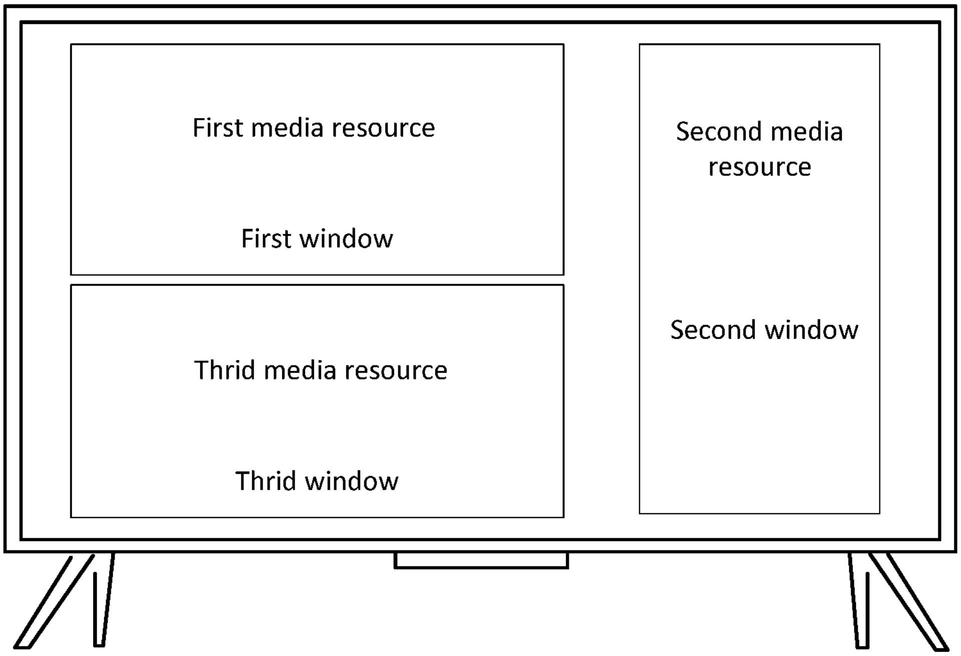
FIG. 5B is a schematic diagram of a display effect of a three-split screen in a split-screen mode according to some embodiments.

FIG. 5A is a schematic diagram showing a display effect of a two-split screen in a split-screen mode according to some embodiments. As shown in FIG. 5A, when the display apparatus 200 enters the two-split screen displaying in the split-screen mode, the display 260 can divide the user interface into two areas, and display a first window and a second window, where the first window can be used to display a playback image of a first media resource, and the second window can be used to display a playback image of a second media resource. The two-split screen may also be referred to as a dual-split screen. FIG. 5B is a schematic diagram of a display effect of a three-split screen in a split-screen mode according to some embodiments. As shown in FIG. 5B, when the display apparatus 200 enters the three-split screen displaying in the split-screen mode, the display 260 can divide the user interface into three areas, which display a first window, a second window and a third window respectively, where the first window can be used to display a playback image of a first media resource, and the second window can be used to display a playback image of a second media resource, and the third window can be used to display a playback image of a third media resource.

Figure 5C:
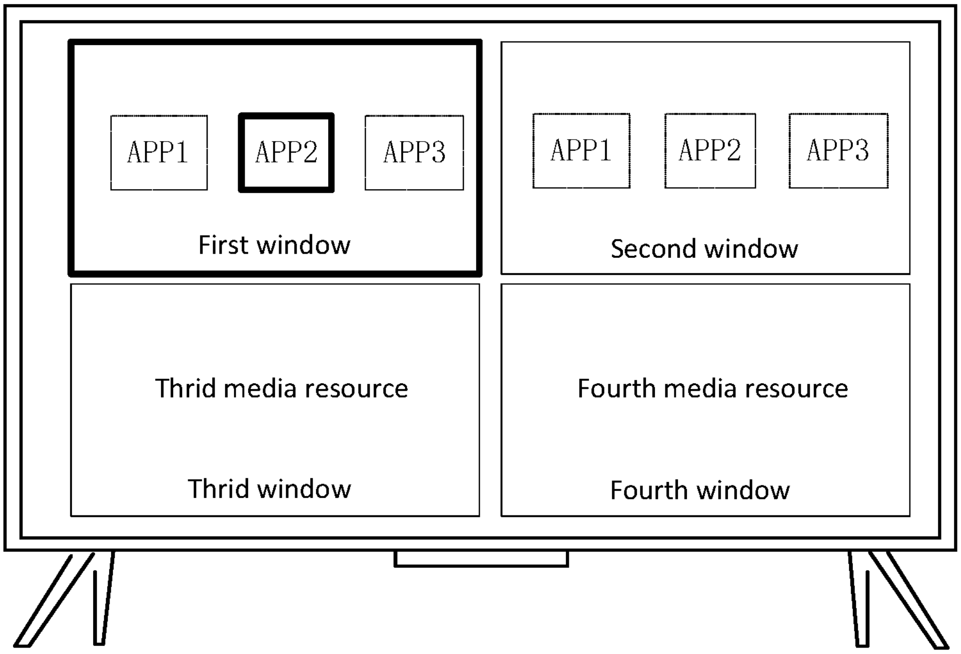
FIG. 5C is a schematic diagram of a display effect of a four-split screen in a split-screen mode according to some embodiments.

In some embodiments, for different scenarios, image contents displayed in the multiple windows may be different. FIG. 5C is a schematic diagram of a display effect of a four-split screen in a split-screen mode according to some embodiments. For example, as shown in FIG. 5C, when the display apparatus 200 enters the four-split screen displaying in the split-screen mode, the display 260 can divide the user interface into four areas, which display a first window, a second window, a third window and a fourth window respectively. An application list is displayed in the first window, an application list is displayed in the second window, and controls for multiple applications are distributed in the application lists. A playback image of a third media is displayed in the third window, and a playback image of a fourth media is displayed in the fourth window. That is, in the split-screen mode, different windows can display different types of interfaces at the same time, and the windows do not interfere with each other.

Figure 6A:
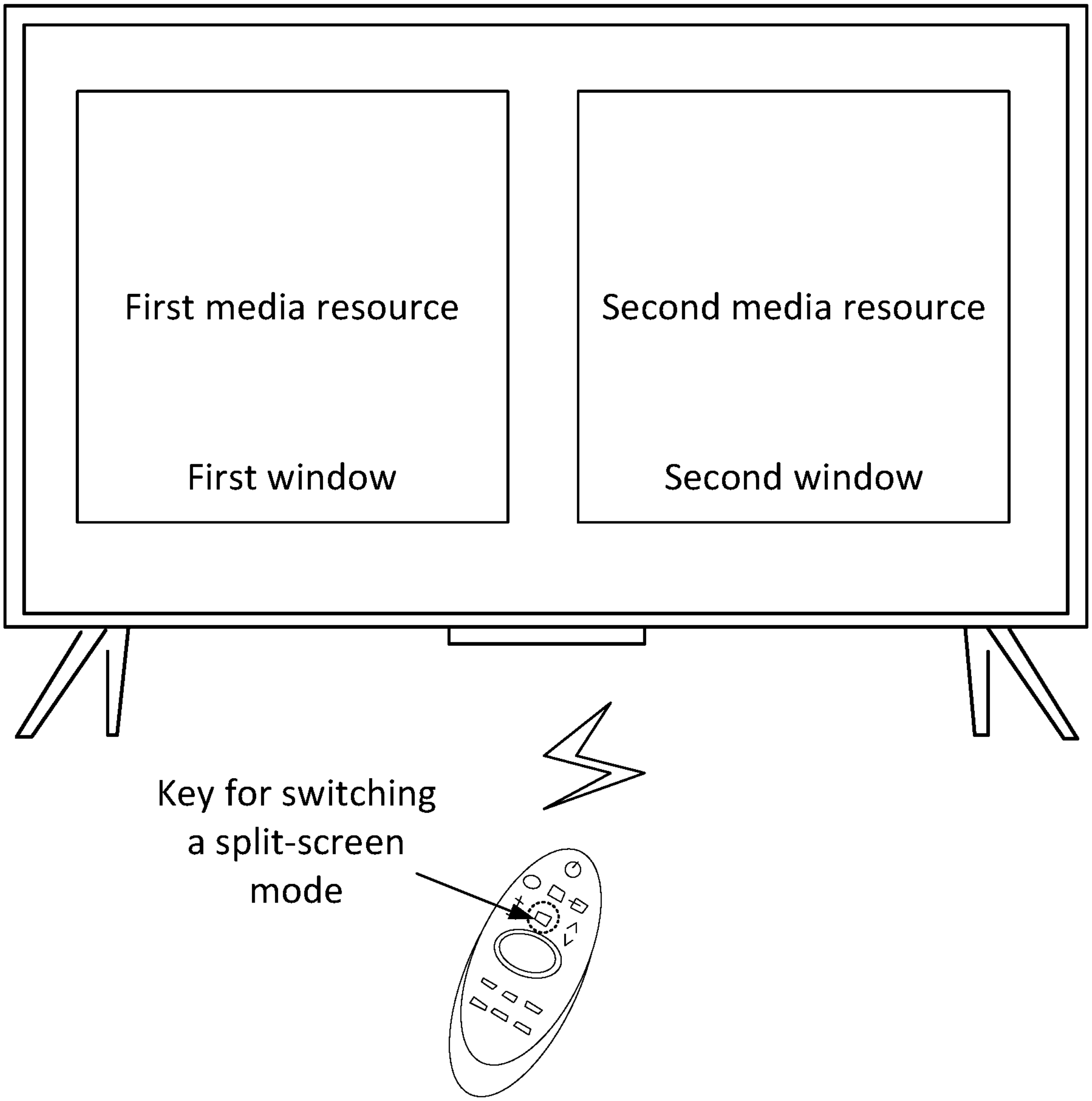
FIG. 6A is a schematic diagram of a display effect of switching a split-screen mode by a key according to some embodiments.
Figure 6B:
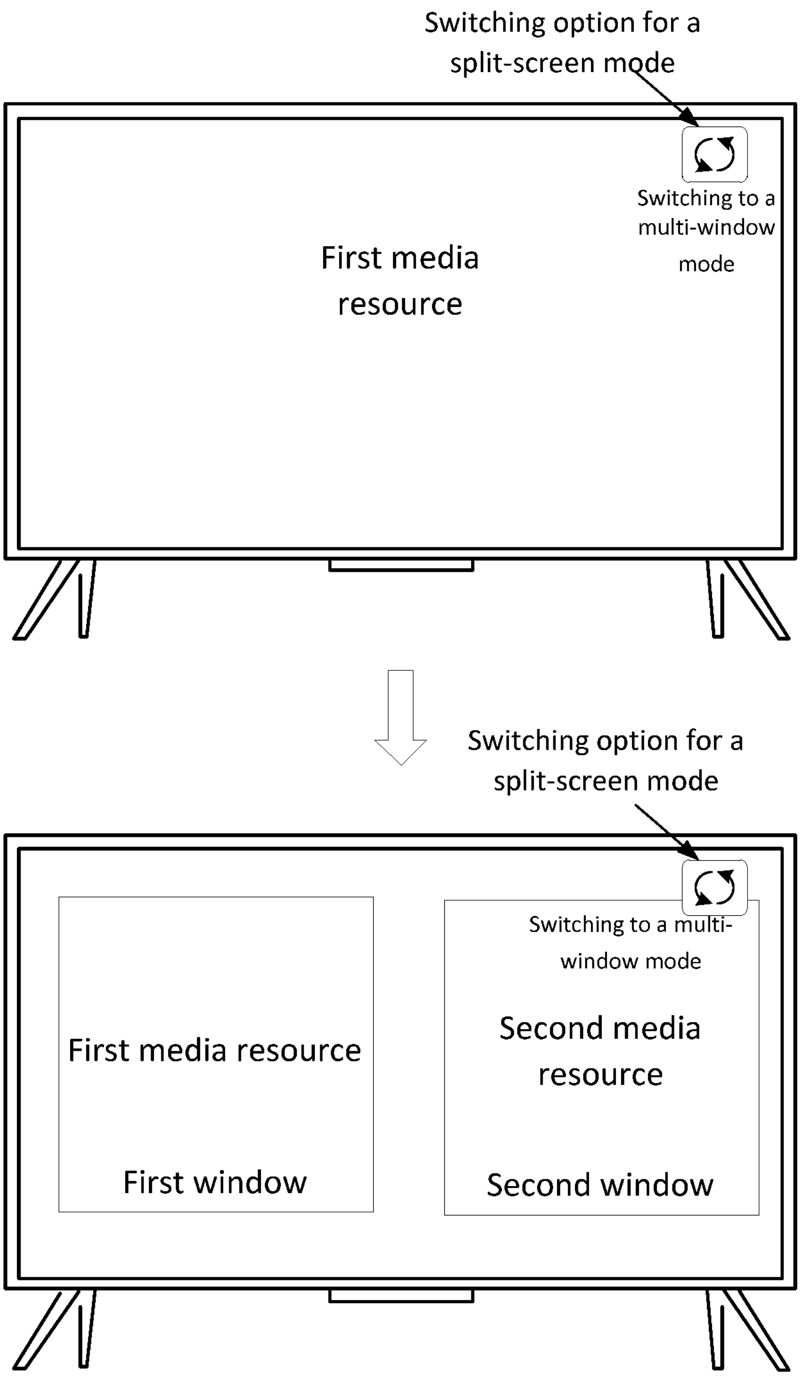
FIG. 6B is a schematic diagram of a display effect of switching a split-screen mode by a switching option according to some embodiments.

In some embodiments, the user can control the display apparatus 200 to enter the split-screen mode through a specific interaction. FIG. 6A is a schematic diagram showing a display effect of switching a split-screen mode by a key according to some embodiments. As shown in FIG. 6A, a key for switching a split-screen mode may be set on the control device 100 configured for the display apparatus 200. When the user presses the key for switching the split-screen mode, the display apparatus 200 can be controlled to enter or exit from the split-screen mode, that is, the display 260 of the display apparatus 200 can be controlled to display multiple windows or a single window. FIG. 6B is a schematic diagram of a display effect of switching the split-screen mode by the switching option according to some embodiments. A switching option for a split-screen mode can also be set on the UI of the display apparatus 200, and when the switching option is selected, the display apparatus 200 can be controlled to enter or exit from the split-screen mode. In some embodiments, the user may control the display apparatus 200 to enter or exit from the split screen mode by voice. For example, after the user inputs wake-up words "Hi! XX", a voice command of "switch to split screen mode" is input to the display apparatus 200, the display apparatus 200 can enter into the split screen mode.

Figure 6C:
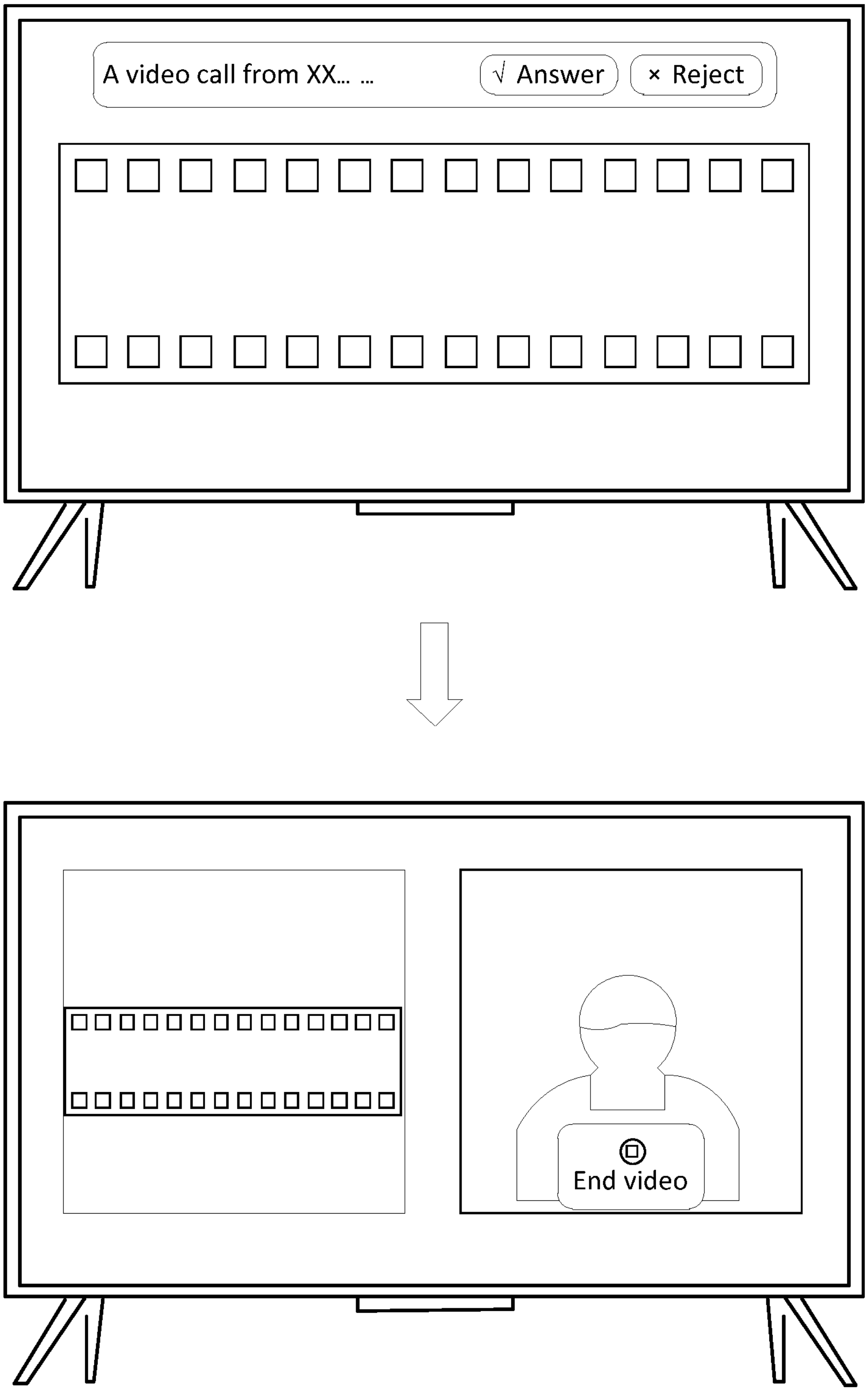
FIG. 6C is a schematic diagram of a display effect of automatically switching a split-screen mode according to some embodiments.
Figure 6D:
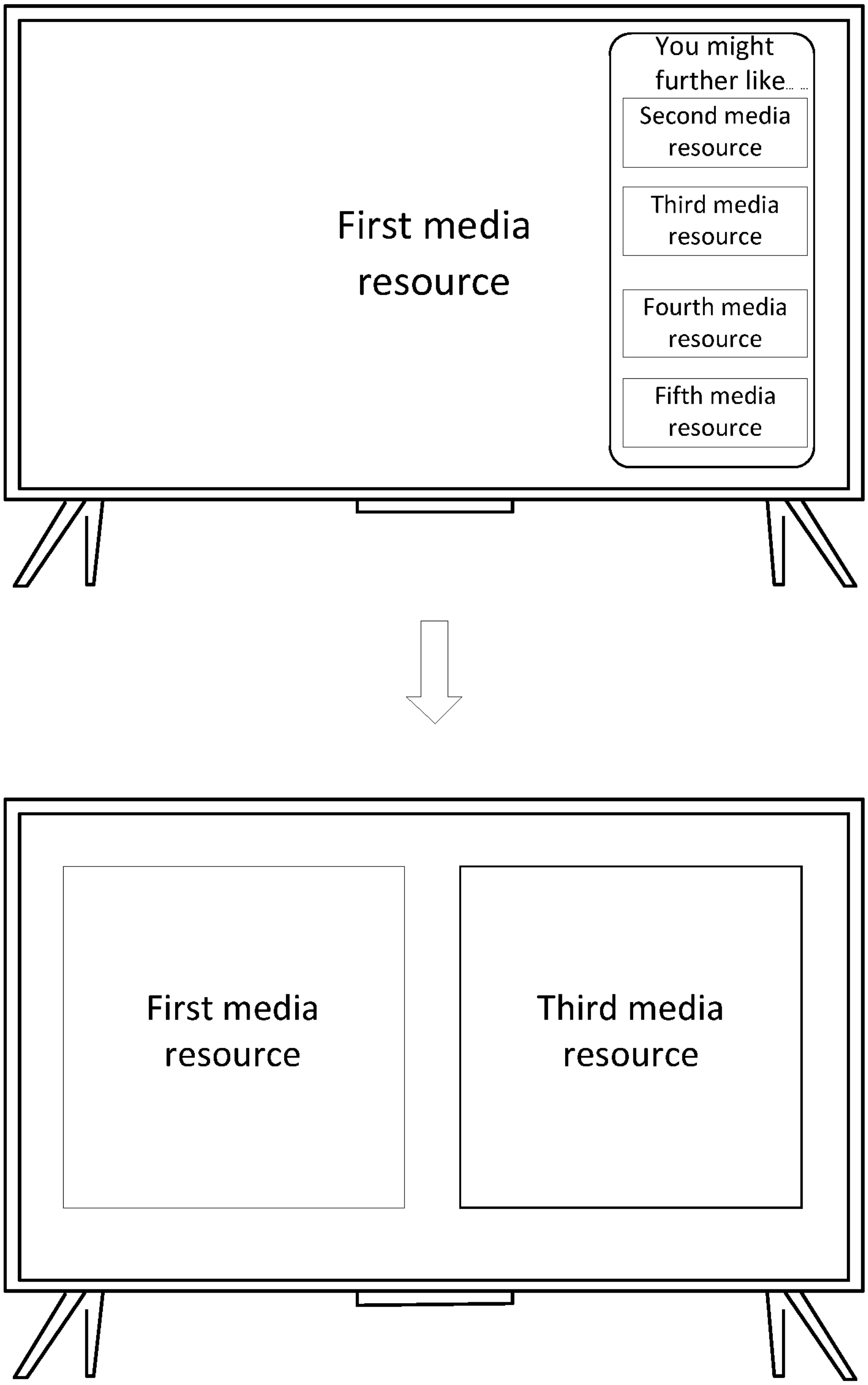
FIG. 6D is another schematic diagram of a display effect of automatically switching a split-screen mode according to some embodiments.

In some embodiments, the display apparatus 200 can also detect a usage status of a user in real time, and determine whether the user has a requirement for multi-window display, so as to intelligently switch a split-screen mode or provide a switching option for the split-screen mode according to the user's need. FIG. 6C is a schematic diagram of a display effect of automatically switching a split-screen mode according to some embodiments. As shown in FIG. 6C, during the display apparatus 200 displays a media image, if there is a video chat request, it can automatically switch to the split-screen mode, so that the display apparatus 200 can display the media image through the first window, and meanwhile, display a video chat image through the second window. FIG. 6D is another schematic diagram of a display effect of automatically switching a split-screen mode according to some embodiments. As shown in FIG. 6D, during the media image play on the display apparatus 200, options for multiple recommended programs may also be displayed on the right side of the user interface. After the user selects any option for a recommended program and confirms it, the user can control the display apparatus 200 to enter the split screen mode, that is, the original media playback image is displayed in the first window, and a playback image corresponding to the recommended program is displayed in the second window.

Figure 6E:
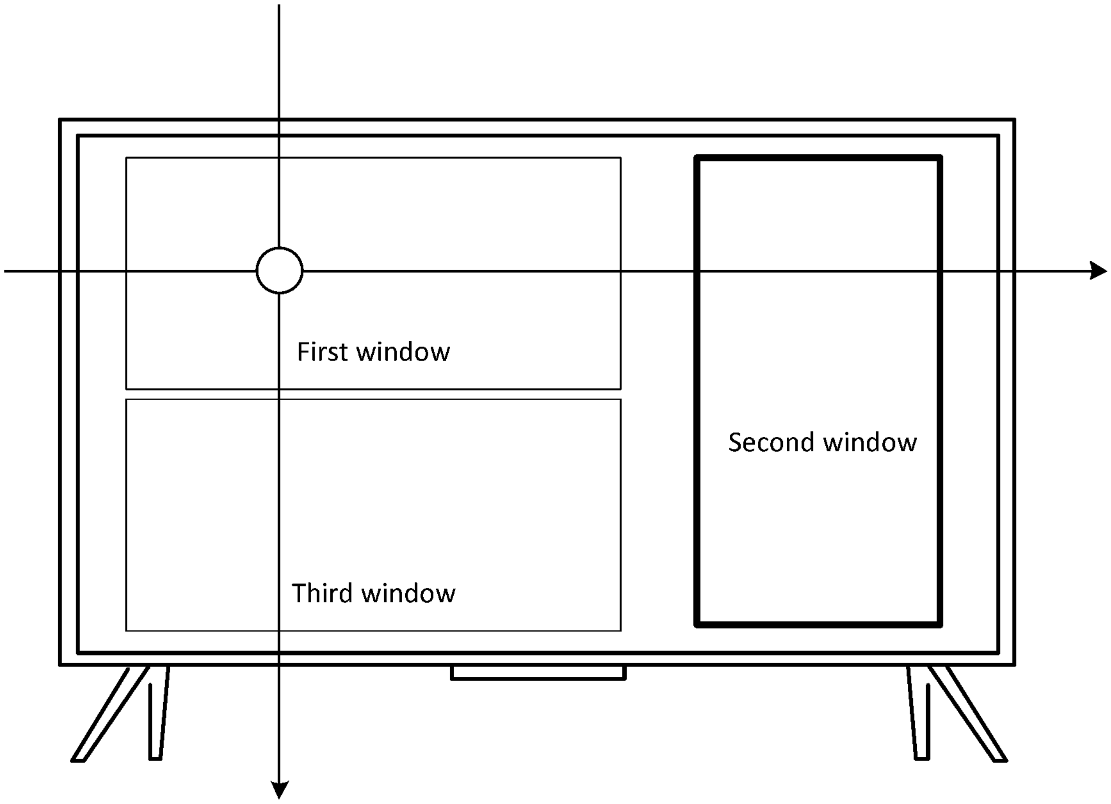
FIG. 6E is a schematic diagram of a display effect of touch event distribution according to some embodiments.
Figure 6F:
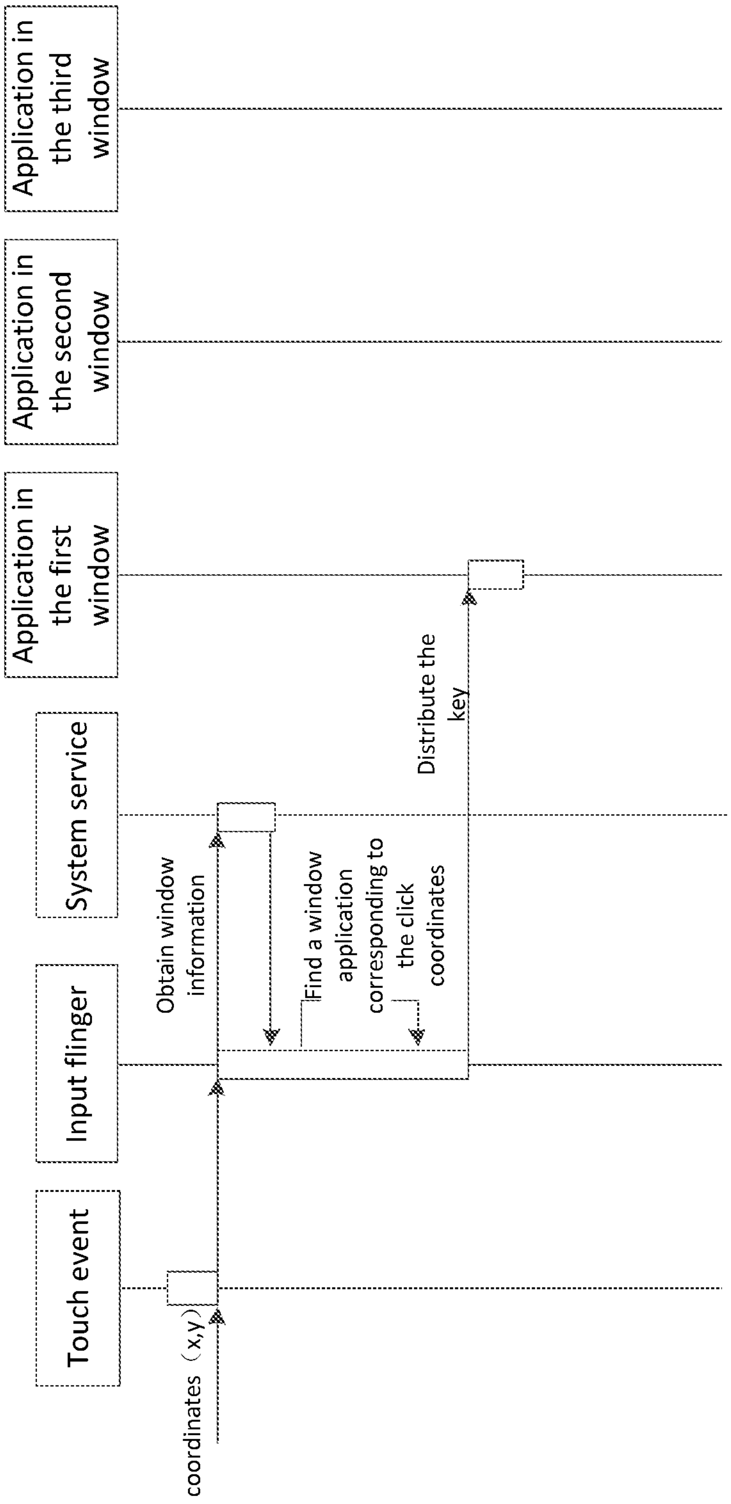
FIG. 6F is a timing diagram of touch event distribution according to some embodiments.
Figure 6G:
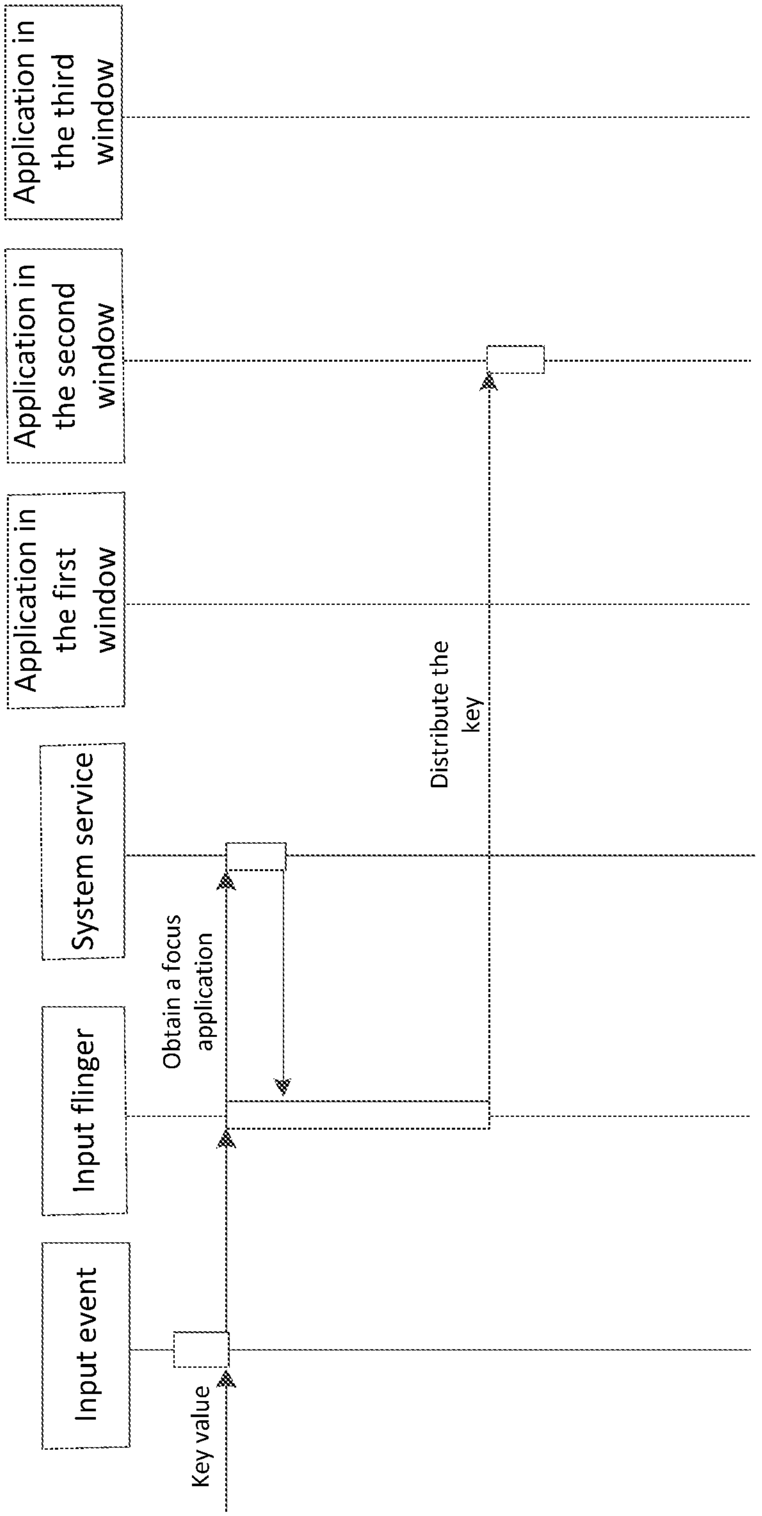
FIG. 6G is a timing diagram of input event distribution according to some embodiments.

In some embodiments, the control device 100 of the display apparatus includes a touch screen, a remote control, a mouse, etc. In the Android system, the touch screen or the mouse calculates a position based on coordinates, and a click event of the touch screen or the mouse in Android is touch event, the touch screen or the mouse can distribute the touch event to an application corresponding to the position, so that a focus is transferred to the corresponding application. FIG. 6E is a schematic diagram of a display effect of touch event distribution according to some embodiments. As shown in FIG. 6E, a position of a current focus is on the second window, and the touch event points to the first window, then the display apparatus 200 distributes the touch event to the first window. FIG. 6F is a timing diagram of touch event distribution according to some embodiments. As shown in FIG. 6F, when the display apparatus 200 receives a touch event including coordinate information (x, y), the input flinger first obtains a window information, i.e., current window information, of a task stack in the system service, then determines, according to the coordinates, which application display range the touch event is triggered in, that is, finds a window application corresponding to the click coordinates, and then directly distributes a key event to the application corresponding to the coordinates, regardless of the task stack on which the current focus is located. For the remote control, the key can only be distributed to the top-most application. FIG. 6G is a timing diagram of input event distribution according to some embodiments. With reference to FIG. 6G, the display apparatus 200 receives an input event. The input event has no coordinate information but only has key value information, so the input flinger obtains the task stack where the current focus is located from the system service, and when the input flinger queries that the current focus is on the application in the second window, the input flinger distributes the key event to the task stack where the second window is located.

In some embodiments, the display apparatus 200 can also detect the usage status of the user in real time, and determine whether the user has a need for multi-window display, so as to intelligently switch the split-screen mode or provide a switching option for the split-screen mode according to the user's need. For example, during display of a media image, a video chat request arrives, it can automatically switch to the split-screen mode, so that the display apparatus 200 can display the media image through the first window, and meanwhile, display the video chat image through the second window. The display apparatus 200 is provided with a projection application, and is connected to the projection device through the projection application and based on a certain projection protocol, so that the user can display the projection content from the projection device on the display according to a projection protocol. For example, in some embodiments, a display apparatus may, based on the same projection service, allow multiple projection devices that support the same projection protocol to project to the same display apparatus, and simultaneously display projection interfaces of the multiple projection devices on the same user interface. Here, the projection device may be a mobile phone, a tablet computer, a computer, a laptop computer, a smart TV, or the like.

In some embodiments, the control device is configured to perform a process for controlling multi-device projects to display on the same screen. First, in response to projection requests of multiple projection devices, the processor 250 connects with the multiple projection devices, where the multiple projection devices support the same projection protocol. The processor 250 receives the projection contents sent from the multiple projection devices, and determines forms of the projection contents. The processor 250 determines a displaying form of a subsequent projection according to the form of the projection content of the last connected projection device which is connected with the display apparatus ranked last according to connection time of the projection devices or which is connected with the display apparatus later than any other projection devices. Here, the form of the projection content refers to a vertical media resource and a horizontal media resource. The displaying form of the projection refers to multi-window display and full-screen display.

In some embodiments, the display apparatus 200 is provided with a selection control for a projection mode in the projection application. After the selection control is clicked, a currently required projection mode is selected. When the user selects a smart mode in projection modes and the projection content of the last connected projection device is a vertical media resource, the processor 250 controls the multiple windows to display the projection contents of the multiple projection devices respectively. When the projection content of the last connected projection device is a horizontal media resource, the processor 250 controls the display to display the projection content of the last connected projection device in full screen.

In some embodiments, in addition to the above-mentioned smart mode, the projection application in the display apparatus 200 also includes a full-screen mode and a split-screen mode. The full-screen mode means that the display apparatus 200 controls the display 260 to display the projection content of the last connected projection device in full screen. The split-screen mode means that regardless of the projection content of the last connected projection device is in the form of the horizontal media resource or the vertical media resource, the projection contents of the multiple projection devices are displayed on the multiple windows.

In some embodiments, a projection application in the display apparatus 200 is provided with a selection control for a projection mode. When the selection control is clicked, a selection list is displayed, and the selection list is provided with a full-screen mode, a split screen mode and a smart mode, the user can select the current projection mode through the selection list. It should be noted that the split-screen mode in the projection modes here refers to the split-screen mode for multi-window display in the display apparatus 200.

<Multi-Device Projection to the Same Screen Base on a Same Projection Protocol>

Figure 7:
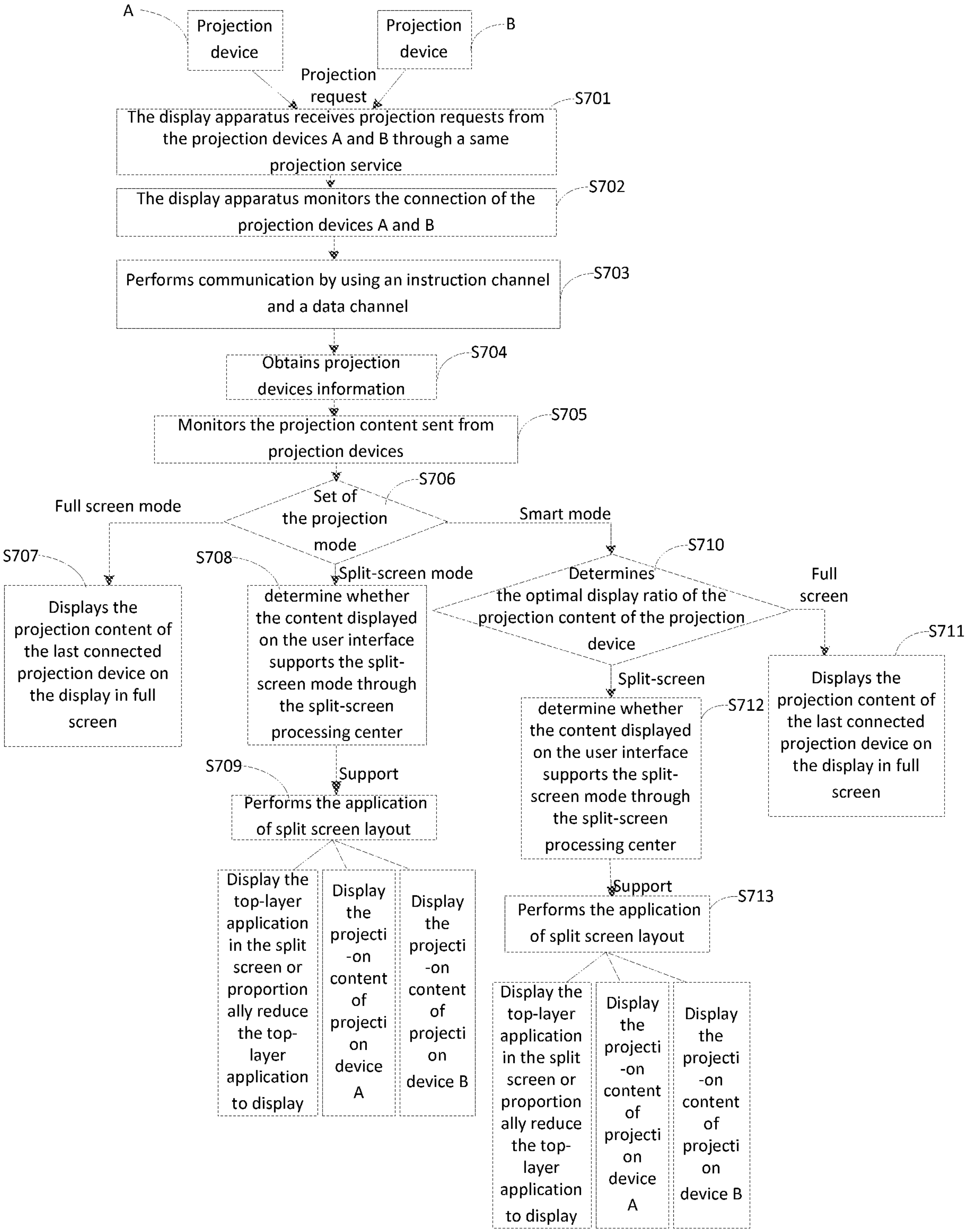
FIG. 7 is a schematic diagram of a projection process of multiple projection devices under the same projection protocol according to some embodiments.

FIG. 7 exemplarily shows a schematic diagram of a projection process of multiple projection devices under the same projection protocol according to some embodiments. As shown in FIG. 7, two projection devices are used as an example for description. The projection device A and the projection device B establish relevant protocol connections with the display apparatus 200 through the same projection protocol to perform operations associated with the projections. Through the protocol specification, relevant protocol information is carried during the communication. For example, based on NFC, the projection device can obtain the device information and network information of the display apparatus 200. After discovering the projection devices A and B, the display apparatus 200 monitors the connection of the projection devices A and B. As shown in FIG. 7, after the display apparatus 200 establishes a connection with each projection device through the same projection service, the display apparatus 260 performs the displaying on the display 260 in the full screen mode, split screen mode or smart mode according to the setting of the projection mode.

In some embodiments, as shown in FIG. 7, the display apparatus 200 receives projection requests from the projection devices A and B through the same projection service (S701); after discovering the projection devices A and B, the display apparatus 200 monitors the connection of the projection devices A and B (S702), the display apparatus 200 performs the client group management, and performs communication by using an instruction channel and a data channel (S703). The interaction of related protocols is performed on the instruction channel, and the transmission of the video stream is performed through the data channel. The display apparatus 200 obtains projection devices information (S704); monitors the projection content sent from projection devices A and B (S705), and sets the projection mode based on the projection content (S706). In response to the projection request, the display apparatus 200 monitors the connection of the projection devices by using the projection service, and performs the group management on the projection devices, where different projection devices correspond to different members in the group. After the projection service receives the projection request from the projection device, the projection service establishes a client group for the corresponding projection device. Different projection devices correspond to different members of the client group, and each member has information of a projection device and protocol interaction information. When different projection devices correspond to different members in the group, the processor 250 controls the projection devices to associate with corresponding device identifiers, where the device identifiers are used to distinguish different members in the group. When the multiple projection devices perform projection displaying through the same protocol, through the processing by the client group and split-screen processing center, it is can be realized that under the same projection protocol, the multiple projection devices can display the projection interface in different Activity stacks in parallel and do not interfere with each other.

Figure 8A:
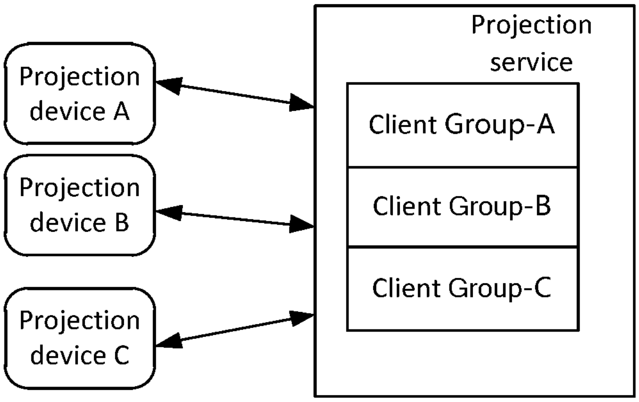
FIGS. 8A to 8B are schematic diagrams of establishing connections between multiple projection devices and a display apparatus under the same projection protocol according to some embodiments.
Figure 8B:
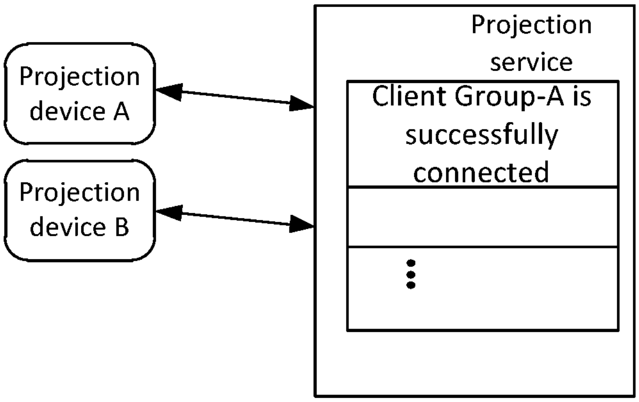

FIG. 8A to 8B are schematic diagrams of establishing connections between multiple projection devices and a display apparatus under the same projection protocol according to some embodiments. In some embodiments, the display apparatus 200 creates a client group for the projection service, and the projection service is required to create a corresponding sub-projection channel according to the number of projection devices that send projection requests, and after receiving a projection request from a projection device, to add a sub-member to the current client group. As shown in FIG. 8A, different projection devices correspond to different members of the client group, and each member has information of a projection device and protocol interaction information. As shown in FIG. 8B, when the display apparatus 200 responds to the projection request of the projection device A, that is, after the projection device A is successfully connected with the display apparatus 200, the next step is to transmit the video stream, and at this time, query the number of connected projection devices in the client group, start the split-screen processing center, and display different projection forms.

<Multi-Device Projection to a Same Screen Base on Different Projection Protocols>

Figure 9A:
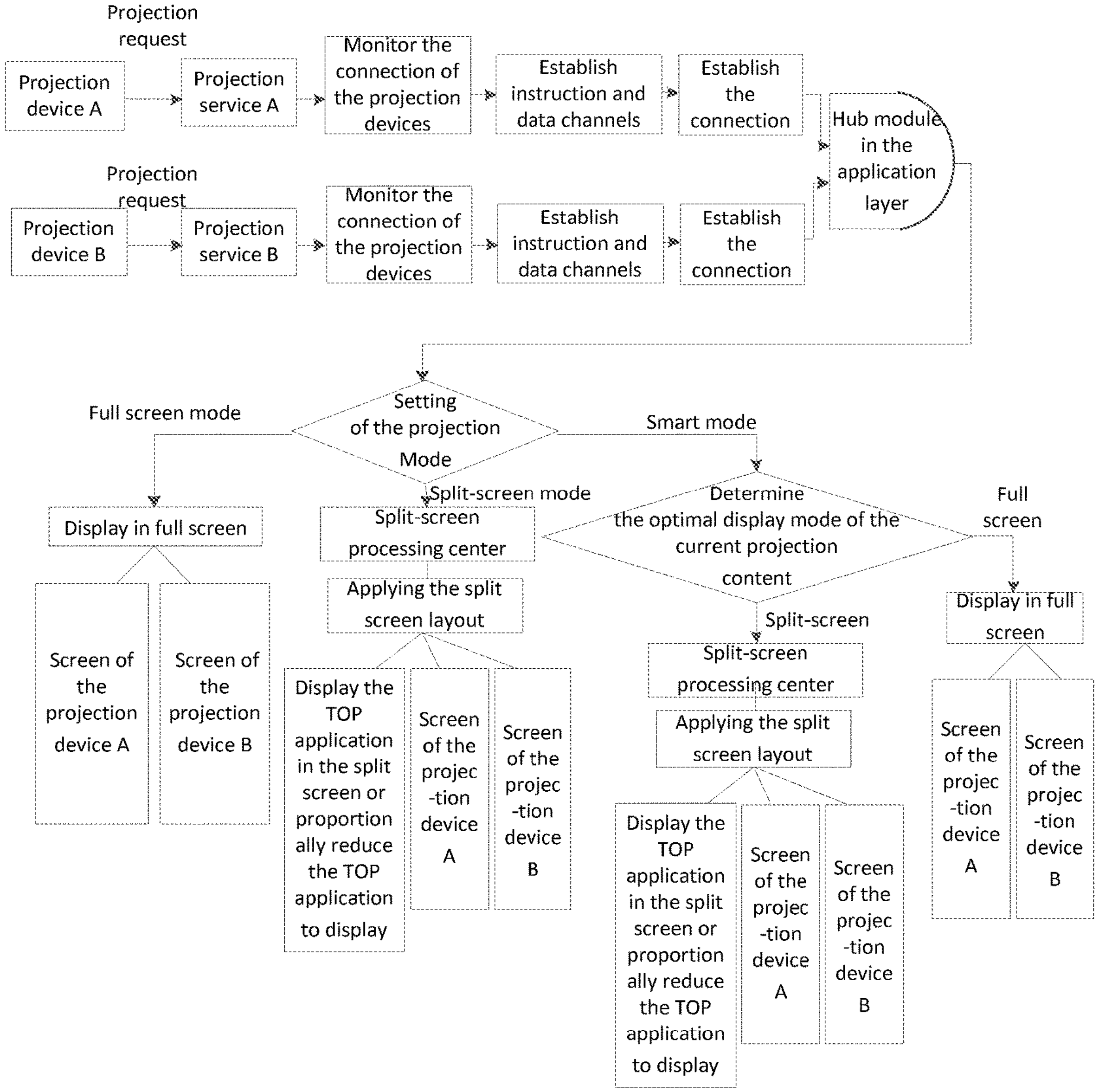
FIG. 9A is a schematic diagram of a projection process of multiple projection devices under different projection protocols according to some embodiments.

FIG. 9A is a schematic diagram of a projection process of multiple projection devices under different projection protocols according to some embodiments. As shown in FIG. 9A, the display apparatus 200 receives projection requests from multiple projection devices respectively through different projection services. The projection device A and the projection device B establish relevant protocol connections with the display apparatus through different projection protocols to perform operations associated with the projections. Through the protocol specification, relevant protocol information is carried during the communication. For example, based on NFC (Near Field Communication), the projection device can obtain device information and network information of the display apparatus 200. In response to the projection request, the display apparatus 200 receives the projection request for monitoring the projection device through projection services of different projection protocols, monitors the connection of the projection device by using the projection service, and creates an instruction channel and a data channel, where the instruction channel is used for instruction exchange between the projection device and the display apparatus, the data channel is used for data exchange between the projection device and the display apparatus. For example, the projection service A in the display apparatus 200 receives a projection request from the projection device A, and the projection service B in the display apparatus 20 receives the projection request from the projection device B. The projection service is responsible for monitoring the connection of the projection device and establishing the instruction channel and the data channel with the projection device. Through the instruction channel, the display apparatus 200 can receive request sent from the user through the projection device, and through the data channel, the display apparatus 200 can receive relevant video data or the like sent from the projection device. After the instruction channel and the data channel are established, the projection device establishes a connection with the display apparatus 200. As shown in FIG. 9A, after the display apparatus 200 establishes connections with respective projection devices through different projection services, the display apparatus 260 performs displaying on the display 260 in the full screen mode, split screen mode or smart mode according to the setting of the projection mode.

In some embodiments, the display apparatus 200 discovers a projection device through projection services based on different protocols, and connects with the projection device after discovering the projection device. For example, when multiple projection devices respectively support the NFC, Airplay and DLNA (Digital Living Network Alliance) projection protocols, the processor 250 receives a projection request from a projection device supporting the NFC protocol by using the NFC protocol service, and monitors the connection of the projection device by using the NFC protocol service. For another example, the processor 250 receives a projection request from a projection device supporting the Airplay protocol by using the Airplay protocol service, and monitors the connection of the projection device by using the Airplay protocol service. For yet another example, the processor 250 receives a projection request from a projection device supporting the DLNA protocol by using the DLNA protocol service, and monitors the connection of the projection device by using the DLNA protocol service. Among them, NFC projection is based on the NFC protocol for two-way device discovery and connection, Airplay projection is based on the Airplay protocol for two-way device discovery and connection, DLNA push is based on the DLNA protocol for projection device discovery and connection, and other protocols are also in this way, i.e., are based on the agreements of their respective protocols for projection device discovery and connection. Among them, Airplay projection refers to a wireless technology developed by Apple, which can wirelessly transmit images, audio, and videos on iOS devices such as mobile phones and tablets to devices that support AirPlay through WiFi.

Figure 9B:
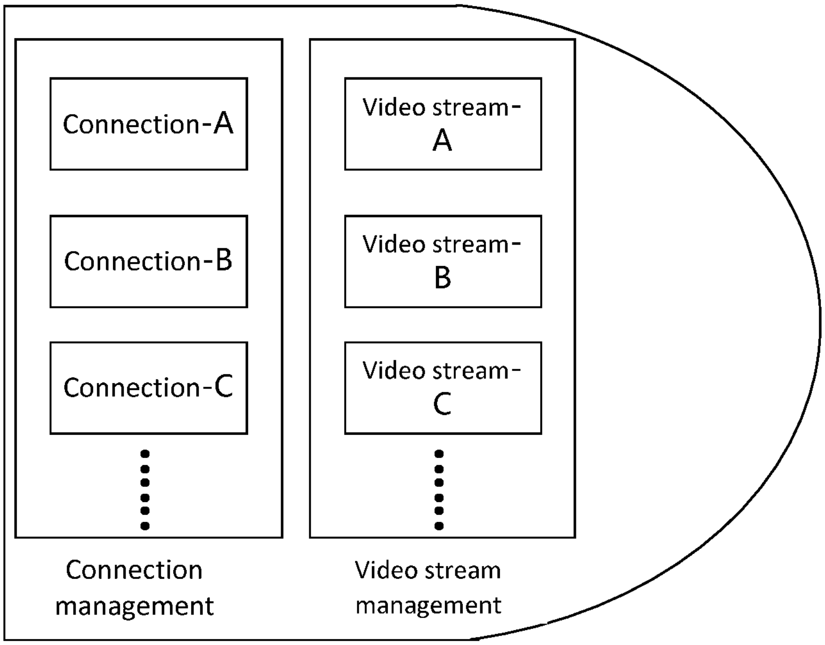
FIG. 9B is a schematic diagram of a hub module in an application layer according to some embodiments.

In some embodiments, after the projection device establishes a connection with the display apparatus 200, the display apparatus 200 is responsible for managing the projection device through a hub module in an application layer. FIG. 9B is a schematic diagram of the hub module in the application layer according to some embodiments. As shown in FIG. 9B, the hub module in the application layer can manage from two aspects. One aspect is connection management, which is responsible for sorting out the data from the projection device which performs projection connection to the display apparatus 200, so as to prepare for the final display effect of the video stream on the projection device. The other aspect is video stream management, which is responsible for classifying and decoding video streams obtained based on different projection protocols.

In some embodiments, after the projection device A establishes connection with the display apparatus 200, the hub module in the application layer is notified, so that the hub module in the application layer can perform the connection management. When the projection device A wants to send projection content, the hub module in the application layer sorts out all the currently connected device members, and then combines the user's setting for the projection mode to activate the split-screen processing center as required and to display different projection forms.

<Single-Device Projection>

Figure 10:
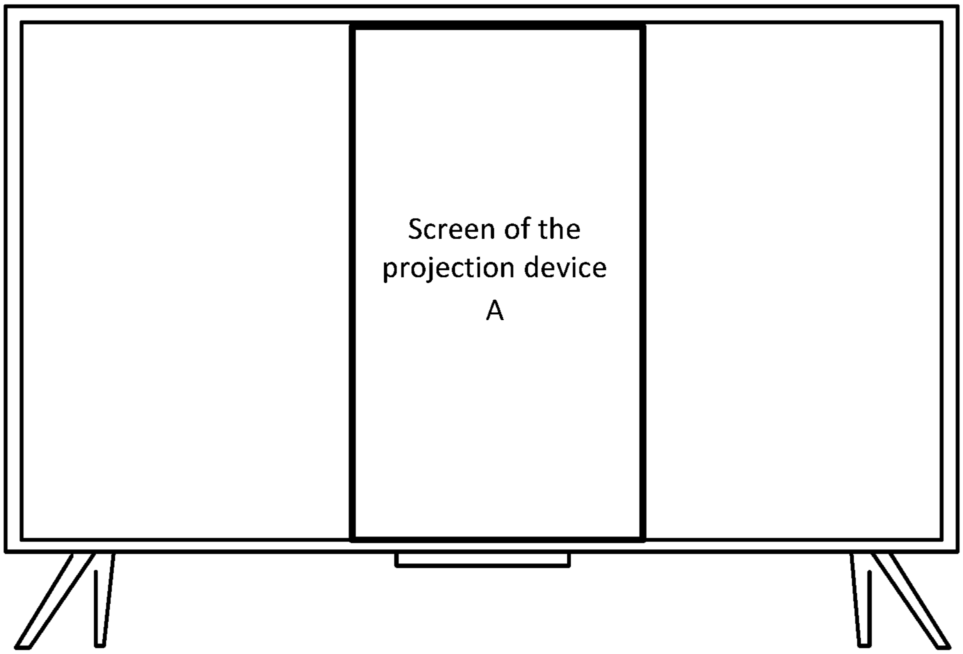
FIG. 10 is a schematic diagram of a display effect of a single-device projection in a full-screen mode according to some embodiments.

Take the display apparatus 200 connecting to one projection device A as an example, that is, the number of connected projection devices in a group is one, and the projection states in different projection modes are described respectively. FIG. 10 is a schematic diagram showing a display effect of a single-device projection in a full-screen mode according to some embodiments. In some embodiments, when the display apparatus 200 determines that the current projection mode is the full-screen mode, after the projection device A sends projection content to the display apparatus 200 through the data channel, the display apparatus 200 can directly display the projection content on the display 260 in full screen. As shown in FIG. 10, the projection content of the projection device A is displayed on the display 260 in the full screen mode, and the projection content may be an operation interface of the projection device A.

In some embodiments, when the display apparatus 200 determines that the current projection mode is the split-screen mode, the display apparatus 200 can further determine whether to display the current user interface of the display apparatus 200 synchronously according to the needs of the user, that is, whether to place the TOP (top-layer) application (or foreground application) of the display apparatus 200 and the projection interface of the projection device on the current user interface presented on the display 260 at the same time. For example, as shown in FIG. 10, when the projection content transmitted from the projection device A is a vertical media resource, and the projection interface shown on the projection device A is also vertical, then when the display apparatus 200 performs displaying, the black frames is on the right and left sides, resulting in poor user experience. If at this time, the TOP application of the display apparatus 200 is presented on the display 260 at the same time, the user can operate the TOP application and view the projection interface of the projection device through the display apparatus 200, thereby improving the user experience. Of course, if the content displayed on the user interface is not displayed synchronously, the projection contents of the multiple projection devices will be displayed in the multiple windows respectively, that is to say, if the user does not need to display the TOP application synchronously, only the projection contents of the projection devices are displayed.

Figure 11:
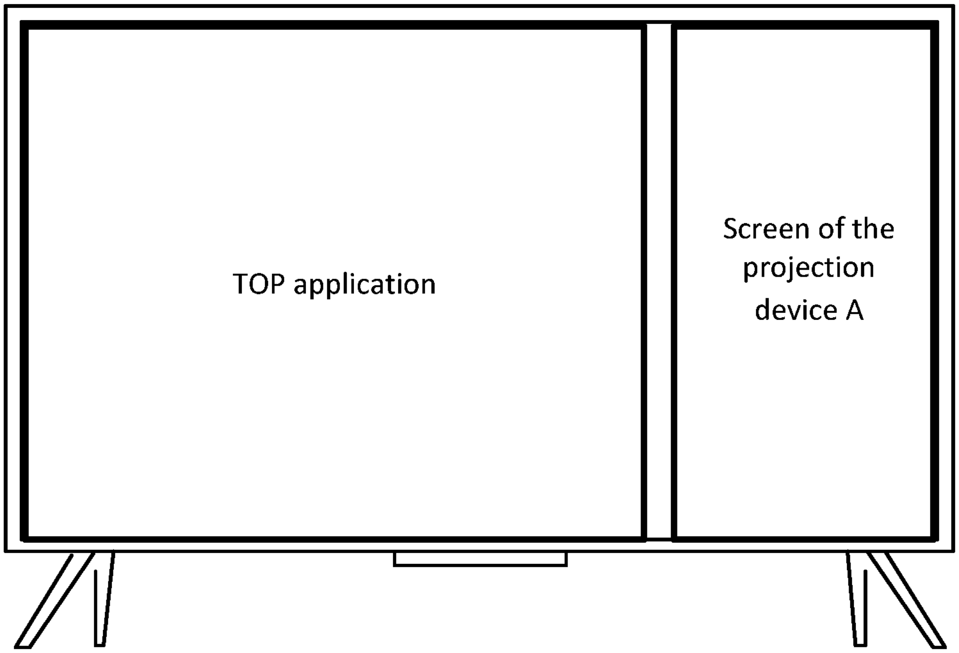
FIGS. 11 to 12 are schematic diagrams of display effects of a single-device projection in a split-screen mode according to some embodiments.
Figure 12:
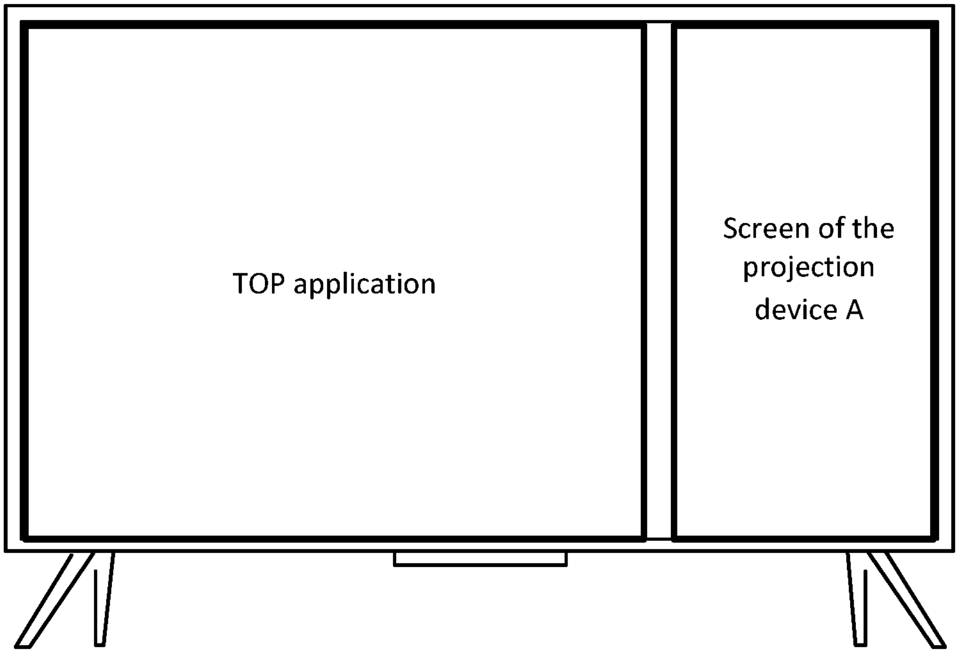

In split-screen mode, if the user wants to display the current user interface and the projection interface at the same time, it is necessary to first determine whether the current user interface supports the split-screen mode through the split-screen processing center. When the current user interface supports the split-screen display, a corresponding number of windows are activated, and the user interface and the projection contents of the multiple projection devices are respectively pushed to the multiple windows through the activity manager interface. When the current user interface does not support the split-screen display, a corresponding number of windows are activated, and the proportionally reduced user interface and the projection contents of the multiple projection devices are respectively pushed to the multiple windows through the activity manager interface. For example, when the TOP application supports the split screen, the split screen processing center causes the display apparatus 200 to enter two-split screens in the split screen mode when the number of projection devices connected, which is obtained from the hub module in the application layer, is 1, places the TOP application in the selected window to display by calling the system split-screen interface, and places the projection interface of the projection device in another window. FIGS. 11-12 are schematic diagrams for showing display effects of a single-device projection in a split-screen mode according to some embodiments. As shown in FIG. 11, the TOP application and the projection interface of the projection device A are displayed in two windows. When the TOP application does not support the split screen, the split-screen processing center can forcibly and proportionally reduce the current TOP application, and as shown in FIG. 12, place the proportionally reduced TOP application in one of the windows for display, and place the projection interface of the projection device in another window for display.

In some embodiments, after receiving the projection content of the projection device A, the projection interface is restarted, and when the current user interface supports the split screen, the split-screen processing center first divides the screen into two halves, sets a position of the current user interface on the left side, and proportionally reduces the user interface by resetting the coordinates, width and height of the user interface, and at the same time, sets a position of the projection content of the projection device A on the right side, so that the split screen processing center causes the display apparatus 200 to enter into two-split screens in the split-screen mode.

In some embodiments, when the display apparatus 200 is in the split screen mode, the user clicks a video in a split screen to play it in full screen, and at this time, the video is played in full screen in the split screen window to which the video belongs. Likewise, when the display apparatus 200 simultaneously displays the TOP application and the projection interface on the user interface shown on the display 260, as shown in FIG. 11, if the user clicks a certain video in the projection interface of the projection device A to play in the full screen, the video is played in the full screen in the window where the projection interface of the projection device A is located.

Figure 13:
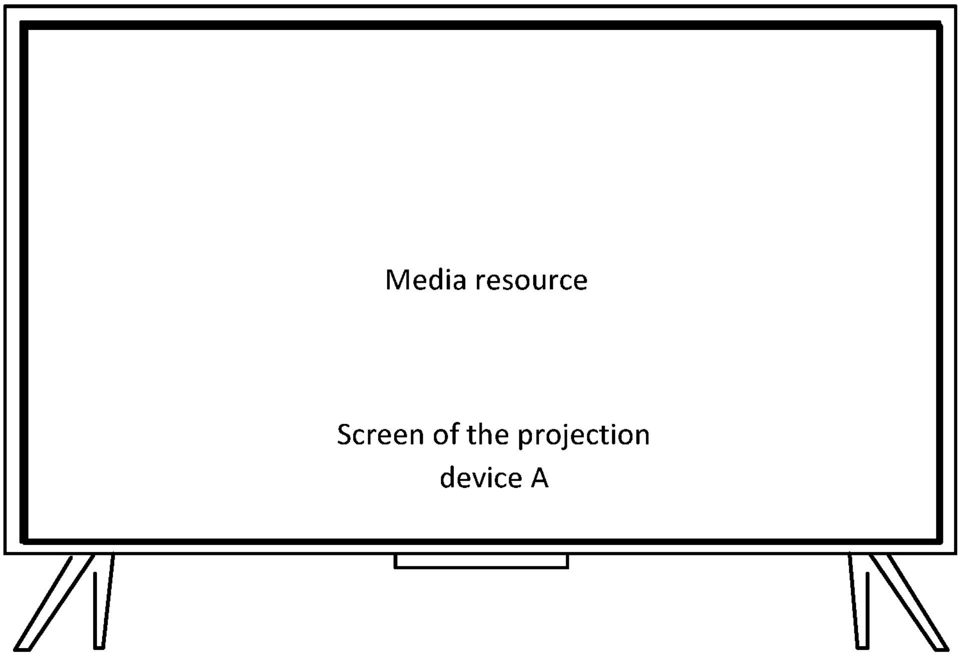
FIG. 13 is a schematic diagram of a display effect of a single-device projection in a smart mode according to some embodiments.

In some embodiments, when the display apparatus 200 determines that the current projection mode is the smart mode, the display apparatus 200 receives the projection content sent from the projection device, and determines the optimal display ratio of the current projection content according to the display ratio of the current projection content. When the projection content sent from the projection device A is a horizontal media resource, that is, when the projection data is a horizontal stream, if a certain video has been pushed, at this time, in order to ensure the user's visual experience, the display apparatus 200 plays the projection content in full screen. FIG. 13 is a schematic diagram of a display effect of a single-device projection in a smart mode according to some embodiments. As shown in FIG. 13, the projection content sent from the projection device A is a horizontal media resource, and the display apparatus 200 causes the display 260 to display the media resource in full screen. When the projection content sent from the projection device A is a vertical media resource, that is, when the projection data is a vertical stream, such as an operation page of a mobile phone, if the projection data is displayed in full screen, black frames is displayed on both sides of the projection interface. In this case, for better user experience, the display apparatus 200 chooses to enter the split-screen mode, only displays the projection interface in one window, and displays the current user interface of the display apparatus in another window. That is, the display apparatus simultaneously displays the current user interface and the projection interface.

<Multi-Device Projections>

Figure 14:
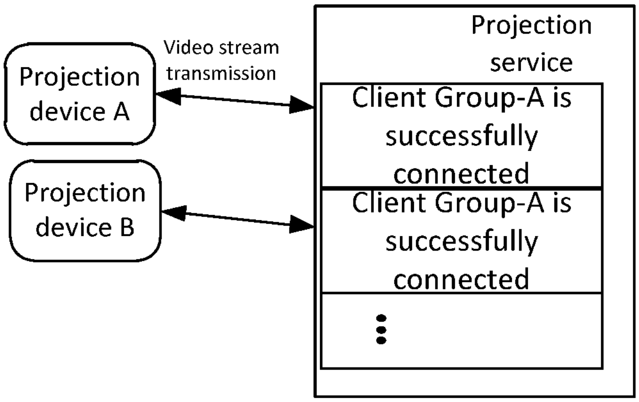
FIG. 14 is a schematic diagram of establishing connections between multiple projection devices and a display apparatus under the same projection protocol according to some embodiments.

It is assumed that the display apparatus 200 is connected with two projection devices, that is, the number of projection devices connected in the client group is 2, and the projection states in different projection modes are described respectively. FIG. 14 is a schematic diagram of establishing connections between the multiple projection devices and a display apparatus under the same projection protocol according to some embodiments. As shown in FIG. 14, the display apparatus 200 successfully connects with the projection device A and the projection device B. In some embodiments, after the display apparatus 200 receives a projection request from a projection device A and establishes a connection with it, the display apparatus 200 first performs projection displaying according to the above-mentioned projection state, then the display apparatus 200 receives a projection request from a second projection device B again and establishes the connection with it, and notifies the hub module in the application layer so that the hub module in the application layer can perform connection management. When the projection device B wants to send projection data, the hub module in the application layer sorts out all the device members currently connected with the display apparatus, starts the split-screen processing center, and displays the following different projection forms.

In some embodiments, referring to FIG. 7, when the display apparatus 200 determines that the current projection mode is the full screen mode through the setting of the projection mode, the display apparatus 200 displays the projection content of the last connected projection device on the display in full screen (S707). That is, after the projection device B sends the projection content to the display apparatus 200 through the data channel, the display apparatus 200 can directly disconnect the previous projection, and directly display the projection content sent from the projection device B on the display 260 in full screen. That is to say, the projection interface of the previously connected projection device A is disconnected first, and the user interface presented on the display 260 is updated to the projection interface of the currently connected projection device B.

Figure 15:
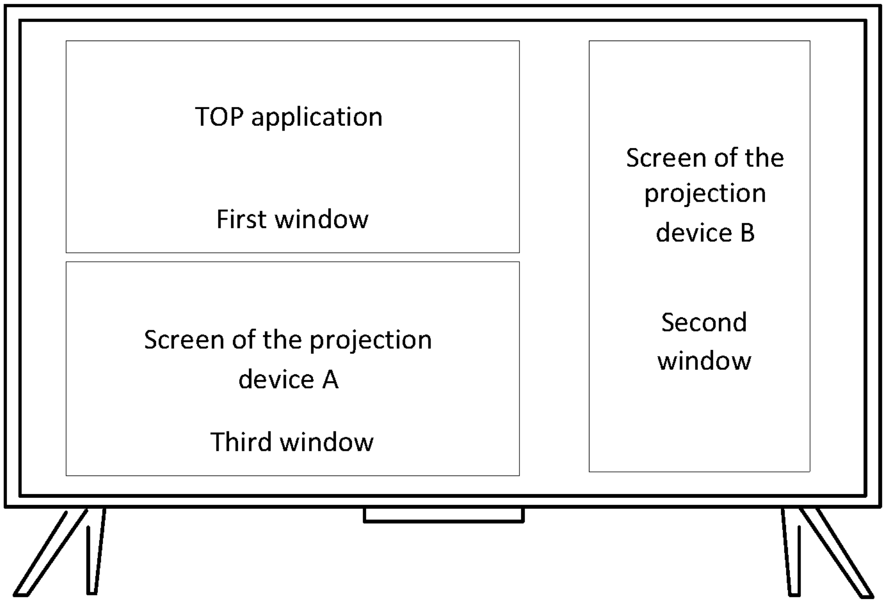
FIGS. 15 to 16 are schematic diagrams of display effects of dual-device projection in a split-screen mode according to some embodiments.
Figure 16:
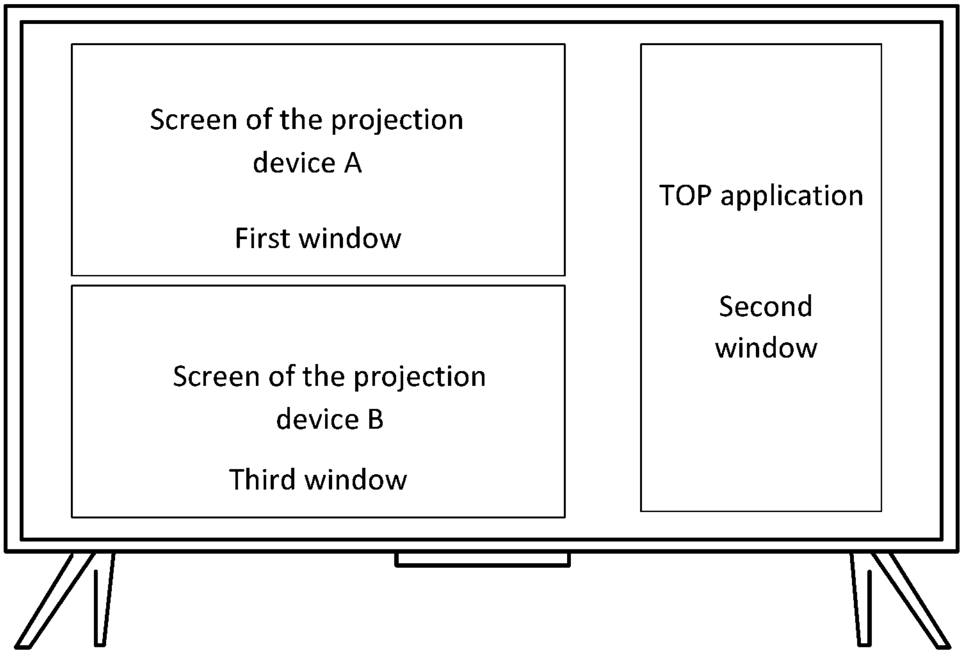

In some embodiments, referring to FIG. 7, when the display apparatus 200 determines that the current projection mode is the split-screen mode through the setting of the projection mode, the display apparatus 200 can determine whether it is necessary to synchronously display the content displayed on the user interface of the display apparatus 200 according to the needs of the user. When the user needs to simultaneously display the content displayed on the user interface and the projection interface, the display apparatus 200 needs to first determine whether the content displayed on the user interface supports the split-screen mode through the split-screen processing center (S708). When the content displayed on the user interface supports the split screen mode, the split screen processing center performs the application of split screen layout (S709), the split screen processing center causes the display apparatus 200 to enter the three-split screen by applying the split screen layout when the number of connected projection devices, which is obtained from the hub module in the application layer, is 2, places the content displayed on the user interface in the selected window to display by calling the system split screen interface, and places the projection interfaces of the two projection devices in another two windows to display respectively. As shown in FIG. 15, the display apparatus 200 is divided into three screens, which are a first window, a second window and a third window. The TOP application in the display apparatus is placed in the first window and the projection interface of the projection device A is placed in the third window and the projection interface of the projection device B is placed in the second window for display. When the content displayed on the user interface does not support the split screen mode, the split-screen processing center can forcibly and proportionally reduce the content presented on the user interface, place it in one of the windows to display, and place the projection interfaces of the two projection devices on another two windows respectively. It should be noted that the display effect is not limited to the way shown in FIG. 15, and other types of layout can also be used. As shown in FIG. 16, the projection interface of the projection device A is placed in the first window, the projection interface the projection device B is placed in the third window and the TOP application is placed in the second window for display.

In some embodiments, for the layout modes in FIGS. 15 and 16, it is necessary to combine the horizontal and vertical screen modes of the projection contents sent from the projection devices. If both projection contents are horizontal streams, the layout mode in FIG. 16 may be selected, if the two projection contents are one horizontal media resource and one vertical media resource, the layout mode in FIG. 15 is selected. Of course, it can also be displayed according to the product definition, which is not limited to the above principles. The layout modes in FIGS. 15 and 16 can be switched, and automatically switching can be implemented according to the horizontal and vertical switching of the projection content sent from the projection device.

In some embodiments, referring to FIG. 7, when the display apparatus 200 determines that the current projection mode is the smart mode through the setting of the projection mode, the display apparatus 200 receives the projection content sent from the projection device B, and determines the optimal display ratio of the projection content of the projection device B according to the display ratio of the projection content of the last connected projection device (S710). When the projection content sent from the projection device B is a horizontal stream, such as pushing a certain video, in this case, in order to ensure the user's visual experience, the display apparatus 200 displays the projection content of the last connected projection device on the display in full screen (S711). When the projection content sent from the projection device B is a vertical stream, such as an operation page of a mobile phone, if the projection content is displayed in full screen, black frames are displayed on both sides of the projection interface. For a better user experience, the display apparatus 200 can make full use of the display area of the display 260, choose to enter the split-screen mode, the display apparatus 200 needs to first determine whether the content displayed on the user interface supports the split-screen mode through the split-screen processing center (S712). When the content displayed on the user interface supports the split screen mode, the split screen processing center performs the application of split screen layout (S713), the split screen processing center causes the display apparatus 200 to enter the three-split screen by applying the split screen layout when the number of connected projection devices, which is obtained from the hub module in the application layer, is 2, places the content displayed on the user interface in the selected window to display by calling the system split screen interface, and display the projection interface of the projection device B in one window, and display the current user interface of the display apparatus and the projection interface of the projection device A in the other two windows, that is, the TOP application of the display apparatus and the projection interfaces of the two projection devices are simultaneously displayed. Of course, if the user does not need to display the TOP application at this time, the display apparatus 200 may enter a two-split screen state, and only display the projection interfaces of the two projection devices.

In some embodiments, the implementation of the three projection modes of the full-screen mode, the split-screen mode, and the smart mode of the display apparatus 200 depends on the split-screen processing center. The split-screen processing center may perform the split-screen logical processing according to the capability support of the current display apparatus 200, perform the overall coordination processing according to the number of the projection devices and, the capability support of the current display apparatus 200, determine which mode the current display apparatus 200 is started in, and be responsible for the specific execution of the split-screen mode. It should be noted that the specific number of split screens and the presentation mode of the display apparatus 200 can be customized, and the presentation modes described herein are not limited.

Figure 17:
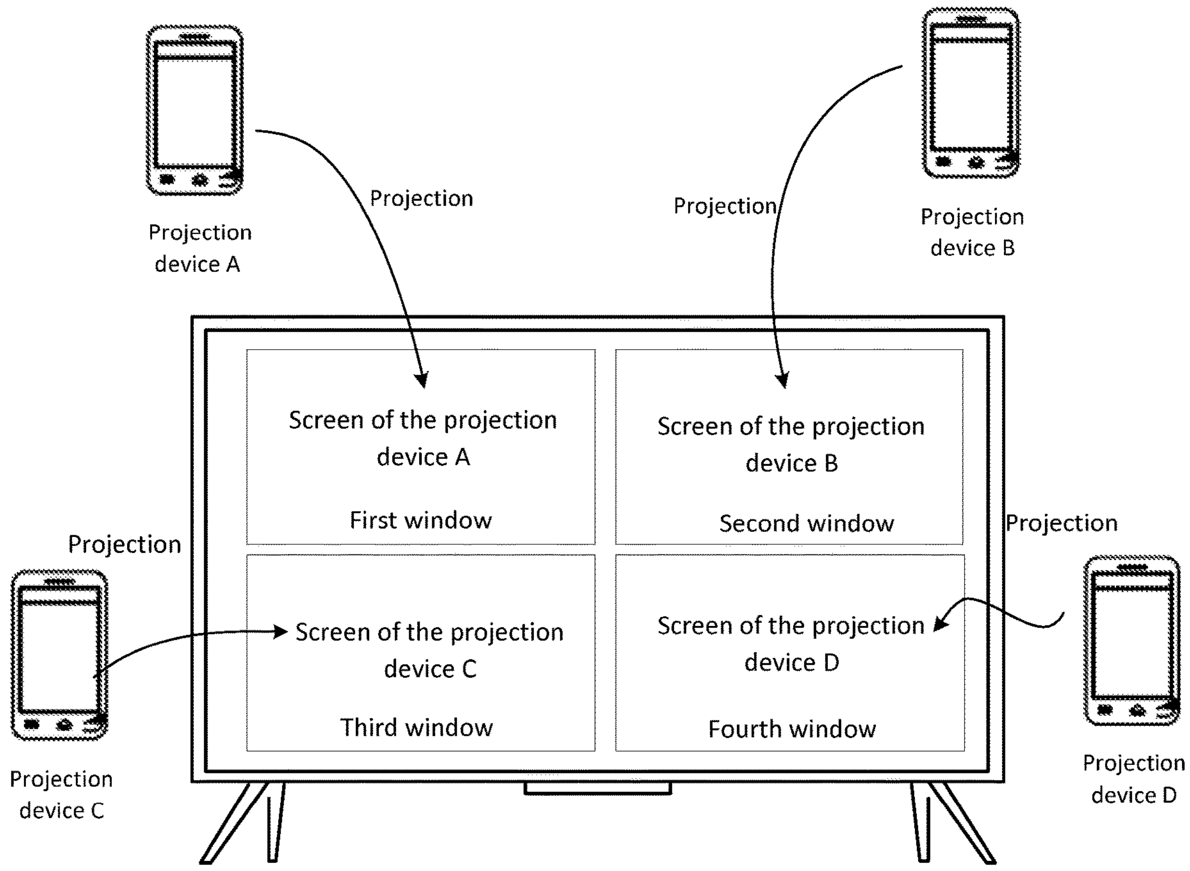
FIG. 17 is a schematic diagram of a display effect of four-device projection in a split-screen mode according to some embodiments.

FIG. 17 is a schematic diagram for showing the display effect of four-device projection in a split-screen mode according to some embodiments. As shown in FIG. 17, a projection device A, projection device B, projection device C, and projection device D all sends projection requests to the display apparatus 200, and the hub module in the application layer sorts out the number of the projection devices connected to the display apparatus 200, and notifies the split-screen processing center. Here, in a scenario where the user does not need to synchronously display the content displayed on the current user interface, the split-screen processing center causes the display apparatus to enter the four-split screen, display the projection interface of the projection device A in the first window, display the projection interface of the projection device B in the second window, display the projection interface of the projection device C in the third window, and display the projection interface of the projection device D in the fourth window.

Figure 18:
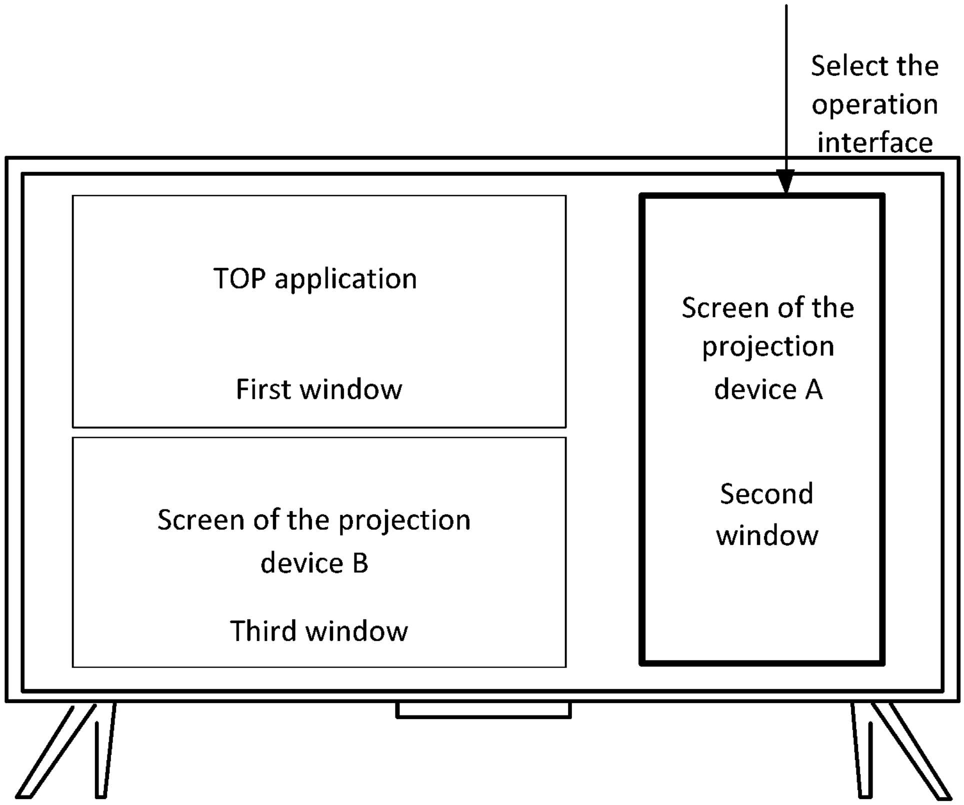
FIG. 18 is a schematic diagram of a selected window in a split-screen mode according to some embodiments.

FIG. 18 is a schematic diagram of a selected window in a split-screen mode according to some embodiments. In FIG. 18, the display apparatus 200 is in a three-split screen state, and the split-screen processing center causes the TOP application and the projection interfaces of the two projection devices to display in three windows respectively. It should be noted that the layout effect in FIG. 18 is only a presentation mode implemented in business, and the user can also customize the layout according to requirements. In addition, the user can control the corresponding projection application, control the interface, and switch between the split-screen mode and the full-screen mode through a remote control terminal.

<The Process of Displaying on a Same Screen from Multiple Projection Devices Based on a Same Projection Protocol>

Figure 19:
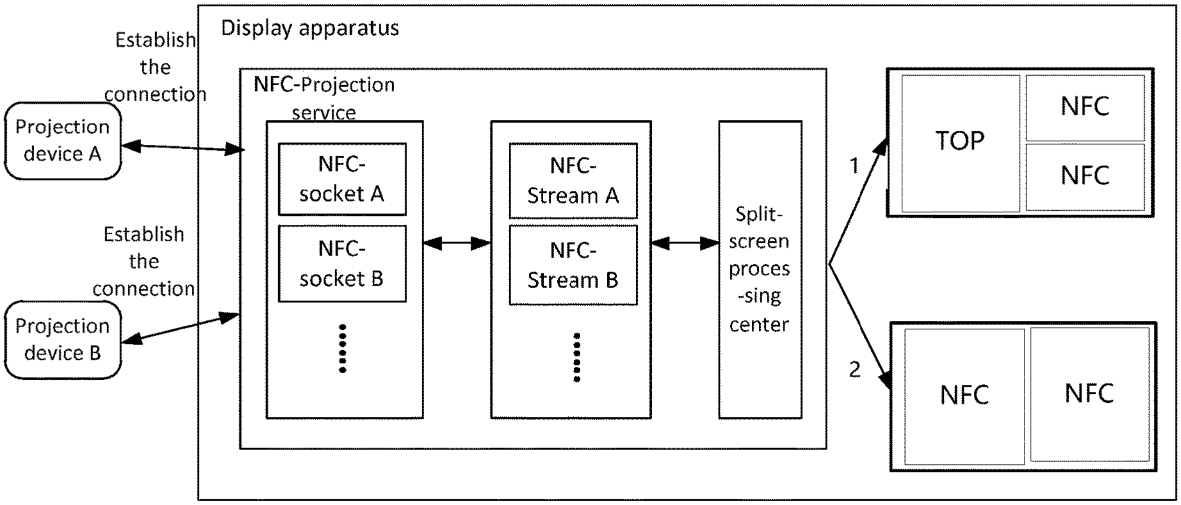
FIG. 19 is a schematic diagram of a projection effect of multiple projection devices under the same projection protocol according to some embodiments.

FIG. 19 is a schematic diagram for illustrating a projection effect of multiple projection devices under the same projection protocol according to some embodiments. As shown in FIG. 19, both projection device A and projection device B establish connections with the display apparatus 200 based on the NFC protocol. First, the projection device A and projection device B are both projection devices that support the same projection protocol, and both projection devices establish connections with the display apparatus through the projection protocol service. First, the device discovery is performed according to relevant protocol. After the device is discovered, the display apparatus monitors instruction exchange and establishes the instruction channel with the mobile terminal, so as to realize interaction of the instructions. After the interaction of the instructions is performed and an agreement is achieved, the data transmission, that is, the transmission of the video stream is performed, and the display apparatus monitors the data from the projection device, and displays the corresponding interface after obtaining the projection data from the projection device. Then, according to the projection protocol, the projection devices can be managed via different group members in the group. The management is roughly from two aspects. One aspect is connection management, and the number of projection devices connected to the display apparatus is obtained through the number of members in the group to prepare for the final display effect of the media resource or video stream. The other aspect is video stream management, and the video stream sent from each projection device is classified and decoded.

Finally, presentation of projected video stream is performed. If the current projection mode of the display apparatus 200 is the full screen mode at this time, the display apparatus 200 displays the projection content of the last connected projection device in full screen. If the current projection mode is the split screen mode, it can be divided into the following two cases of layouts. Case 1: the TOP application is needed to display synchronously. After three projection video streams arrive, three projection video stream interfaces can be displayed synchronously with the TOP application in four-split screen manner. Case 2: the TOP application does not need to display synchronously, the three projection video stream interfaces needs to be laid out and presented. The layout positions of the projection interfaces may be laid out according to the timing sequence of the video streams, and the displaying form is not limited to the above form. If the current projection mode is the smart mode, the projection content of the last connected projection device is further determined. If the projection content of the last connected projection device is a vertical media resource, according to the processing method in the split-screen mode, the projection contents of the multiple projection devices are displayed in the multiple windows respectively. If the projection content of the last connected projection device is a horizontal media resource, according to the processing method in the full screen mode, the projection content of the last connected projection device is displayed on the display in full screen.

<The Process of Presenting on a Same Screen from Multiple Projection Devices Based on Different Projection Protocols>

Figure 20:
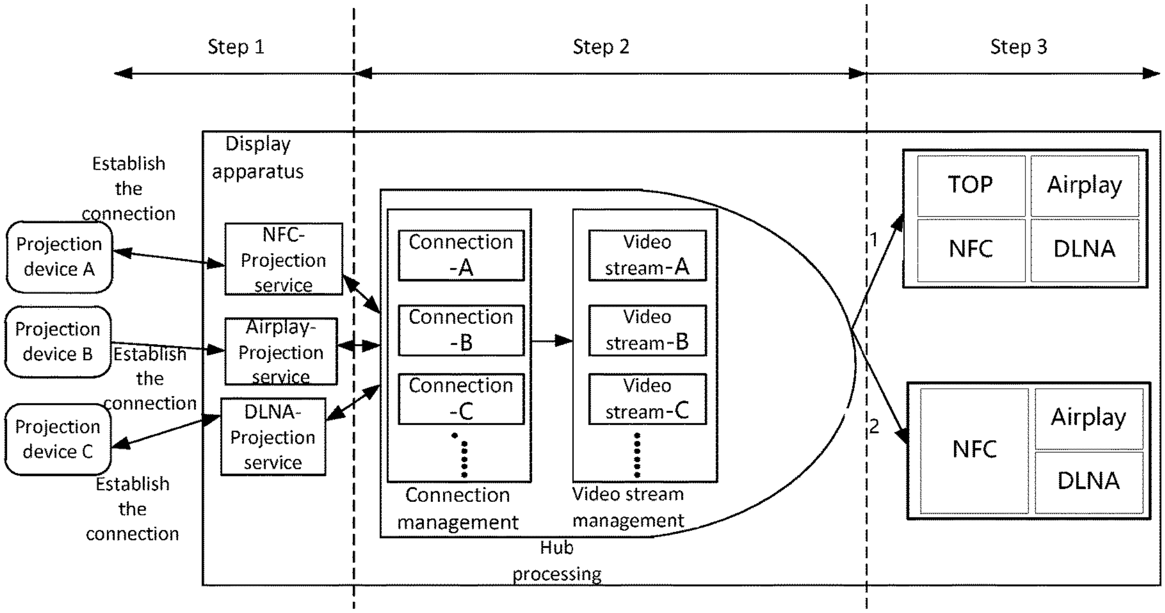
FIG. 20 is a schematic diagram of a projection effect of multiple projection devices under different protocols according to some embodiments.

FIG. 20 is a schematic diagram of a projection effect of the multiple projection devices base on different protocols according to some embodiments. As shown in FIG. 20, taking the NFC projection, Airplay projection, and DLNA projection as examples, the display apparatus 200 has projection services, i.e., NFC service, Airplay service, and DLNA, to realize the push of the mobile terminal.

Step 1: the projection device A, projection device B, and projection device C respectively establish connections with the display apparatus through corresponding protocol services. For example, the display apparatus 200 receives a projection request from the projection device A supporting the NFC protocol via the NFC service, and monitors the connection of the projection device A by using NFC service, receives the projection request from the projection device B supporting the Airplay by using the Airplay service and monitors the connection of the projection device B by Airplay service, and receives a projection request from the projection device C supporting the DLNA protocol by using the DLNA service and monitors the connection of the projection device C by using the DLNA service.

Figure 21:
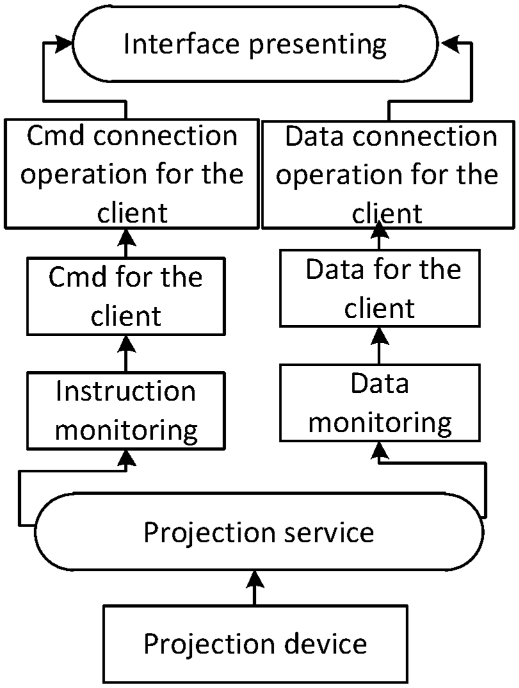
FIG. 21 is a schematic diagram of establishing a connection between a projection device and a display apparatus according to some embodiments.

FIG. 21 is a schematic diagram of establishing a connection between a projection device and a display apparatus according to some embodiments. As shown in FIG. 21, during establishing an instruction channel and a data channel between the projection device and the display apparatus, the device discovery is first performed according to the protocol, after the device is discovered, the display apparatus monitors instruction exchange and establishes instruction channel with the mobile terminal, so as to realize the interaction of the instructions. After the interaction of the instructions is performed and an agreement is achieved, the data transmission, that is, the transmission of the video stream is performed, and the display apparatus monitors the data from the projection device, and displays the corresponding interface after obtaining the projection data of the projection device.

Step 2: the hub module in the application layer needs to manage the projection devices and the display apparatus according to corresponding projection protocols, that is, pivot processing is performed in the hub module in the application layer, which is roughly divided into two aspects for management. One aspect is connection management configured for determining the number of projection devices in projection connection with the display apparatus to prepare for the final display effect of the video stream(s). The other aspect is video stream management and the video stream management is used for classifying and decoding the video streams according to different projection protocols, so that the display apparatus 200 displays the projection content in the window.

Step 3: perform projection video stream presenting processing. If the current projection mode of the display apparatus 200 is the full screen mode at this time, the display apparatus 200 displays the projection content of the last connected projection device in full screen. If the current projection mode is the split screen mode, it can be divided into the following two cases of layout. Case 1: the TOP application is needed to display synchronously. After the three projection video streams arrive, three projection video stream interfaces can be displayed synchronously with the TOP application in the four-split screen manner. Case 2: the TOP application does not need to display synchronously, the three projection video streams are laid out and presented on corresponding interfaces. The layout positions of the projection interfaces may be laid out according to the timing sequence of the video streams, and the presentation form is not limited to the above form. If the current projection mode is the smart mode, the projection content of the last connected projection device is further determined. If the projection content of the last connected projection device is a vertical media resource, according to the processing method in the split-screen mode, the projection contents of the multiple projection devices are displayed in multiple windows respectively. If the projection content of the last connected projection device is a horizontal media resource, according to the processing method in the full screen mode, the projection content of the last connected projection device is presented on the display in full screen.

In the display application, the display apparatus 200 may receive projection requests from multiple projection devices according to different projection protocols or projection requests from multiple projection devices according to the same projection protocol, and display the projection interfaces of the multiple projection devices on the same screen on the user interface of the display, so as to improve user's experience.

Some embodiments of the present application provide a method for controlling multi-device projections to display on a same screen, including: establishing connections with the multiple projection devices by using the same projection service, so as to cause the display apparatus to receive the projection contents from the multiple projection devices, where the multiple projection devices support the same projection protocol. When the current projection mode is the full screen mode, the projection content of the last connected projection device is displayed on the display in full screen. When the current projection mode is the split screen mode, the projection contents of the multiple projection devices are displayed in multiple windows respectively. When the current projection mode is the smart mode, if the projection content of the last connected projection device is a vertical media resource, the projection contents of the multiple projection devices are respectively displayed in the multiple windows, and if the projection content of the last connected projection device is a horizontal media resource, the projection content of the last connected projection device is displayed on the display in full screen. In this application, the display apparatus may display media contents in the multiple windows, connect the multiple projection devices, and display the projection contents in different projection modes, which greatly improve the user experience.

In some embodiments, when the user interface includes one window, the display is controlled to display the projection content of the final projection device which connects with the display apparatus last in time or later than any other projection device in full screen.

In some embodiments, when establishing connections with the multiple projection devices, the method includes: receiving projection requests from the multiple projection devices through the same projection service; in response to the projection requests, monitoring the connections of the projection devices by using the projection service, and performing group management on the projection devices, where different projection devices correspond to different members in a group; and creating instruction channels and data channels with the projection devices according to the members in the group, where the instruction channels are used for instruction interactions between the projection devices and the display apparatus, and the data channels are used for data interactions between the projection devices and the display apparatus.

In some embodiments, when the different projection devices correspond to different members in the group, the projection devices are associated with corresponding device identifiers, where the device identifiers are used to distinguish different members in the group.

In some embodiments, when causing the multiple windows to display the projection contents of the multiple projection devices respectively, if a content displayed on a user interface is retained, controlling the multiple windows to display the user interface and the projection contents of the multiple projection devices respectively; and if the content displayed on the user interface is not retained, controlling the multiple windows to display the projection contents of the multiple projection devices respectively.

In some embodiments, when the content displayed on the user interface is retained, and the multiple windows are controlled to display the user interface and the projection contents of the multiple projection devices respectively, the method includes: when a current user interface supports split-screen display, activating a corresponding number of windows, and pushing the user interface and the projection contents of the multiple projection devices respectively to the multiple windows through an activity manager; and when the current user interface does not support split-screen display, activating a corresponding number of windows, and pushing a proportionally reduced user interface and the projection contents of the multiple projection devices respectively to multiple windows through the activity manager.

In some embodiments, when controlling the multiple windows to display the projection contents from the multiple projection devices respectively, receiving an selection operation via a media resource control in any window, where the media resource control is used to display a corresponding multimedia resource; and according to the selection operation, if the corresponding multimedia resource is a horizontal media resource, playing the corresponding multimedia resource in the window where the media resource control points in full screen.

In some embodiments, when proportionally reducing the user interface, coordinates, a width and a height of the user interface is reset accordingly, so that the user interface is proportionally reduced.

Some embodiments of the present application provide a method for multi-device projections to display on the same screen, including: establishing connections with the multiple projection devices by using multiple projection services respectively, so that the display apparatus receives the projection contents from the multiple projection devices, where the multiple projection devices support different projection protocols. When the current projection mode is the full screen mode, the projection content of the last or final connected projection device is presented on the display in full screen. When the current projection mode is the split screen mode, the projection contents from the multiple projection devices are displayed in the multiple windows respectively. When the current projection mode is the smart mode, if the projection content of the last or final connected projection device is a vertical media resource, the projection contents from the multiple projection devices are respectively displayed in the multiple windows, and if the projection content of the last connected projection device is a horizontal media resource, the projection content of the last connected projection device is presented on the display in full screen.

<Focus Switch>

Android system itself has the multiple windows. As a window is opened, usually the recent opened window has the focus. Android may directly distribute a directional touch event to the application clicked by the user, but for the Input event, since the Input has no direction, Android system can only distribute the input event to a task stack where the current focus is located. Currently, when the display apparatus 200 is in the split-screen mode, the user interface presented on the display 260 is divided into multiple windows. For the multiple windows, the user can only control the content in a window located at the top layer of the user interface through the control device 100, and cannot control the content of other windows. As a result, the user cannot perform a selection operation among the multiple windows, so the experience is not good.

In view of the above problems, a display apparatus is provided in some embodiments. Here, for the convenience of description, a state where a focus exists and a content displayed in a window is able to be operated according to user's commands via the focus, is referred to as a first state, that is, in the first state, the content displayed in the window can obtain the focus. As shown in FIG. 5C, the first window displaying an application list control is the window in the first state, and the window is marked by a focus frame. The operation for the APP from the user can be realized in the first window. A state where a focus exists but a content displayed in a window is not be able to respond to user's commands via the focus is referred to as a second state, that is, the window in the second state can obtain the focus, and the window in the second state can also be marked through the focus frame to prompt a window position in the current second state. It should be noted that the forms of the focus frames in the first state and the second state are different, which may be different in color, different in the thickness of the line, or different in the form of the line. etc.; a state in which a window does not acquire the focus is referred to as a third state, for example, the second window, the third window and the fourth window in FIG. 5C are all windows in the third state.

In some embodiments, when the display apparatus 200 enters the split-screen mode, that is, when the display 260 displays the multiple windows, in this case, according to the preset settings of the display apparatus 200, the first window may be a window in the first state by default, that is, after the display apparatus 200 enters the split-screen mode, the user may control the content displayed in the first window through the control device 100. In order to indicate the position of the current focus, the window in the first state can be marked by a first mark. For example, the window in the first state is marked by a focus frame, and the color of the focus frame may be a thick red line, which is not limited here. When the user sees the window marked by the focus frame with the thick red line, he/she may know that the window is in the first state at this time.

In some embodiments, the first mark is presented when the user operates the content displayed in the window in the first state, and the first mark is hidden when the user does not operate the content displayed in the window in the first state. That is, in order to ensure the user's visual experience, the display apparatus 200 may only prompt the user which window is currently marked as the first state via blinking state of the first mark. When the user wants to switch the window and control the contents displayed in other windows, the user may issue a command to the display apparatus 200, and the processor 250 in the display apparatus 200 starts a window switch mode of the display apparatus 200 after receiving the command.

In some embodiments, the processor 250 marks the first window in the first state as the second state according to the received command, including: according to the command, moving the focus between the multiple windows, and replacing the first mark of the first window with a second mark. At this time, the display apparatus 200 enters into a window switch mode, where no window is in the first state among all windows on the display 260, but there is only window(s) in the second state on the display 260. In other words, in this mode, the user can only switch focus between windows, and cannot operate the content displayed in the window(s).

In some embodiments, for a window marked in the second state, the marking may be implemented by the second mark, and the first mark and the second mark are focus frames with different forms. That is, the form of the focus frame used to mark the second state is different from the form of the focus frame used to mark the first state, for example, may be selected as a thin green line. After the user starts window switch mode of the display apparatus 200, the user further sends a selection instruction according to the spatial arrangement of the multiple windows on the display 260. The processor 250 receives the selection instruction sent from the user, marks the window selected by the user as the second state, and marks the first window from the second state to the third state.

Figure 5D:
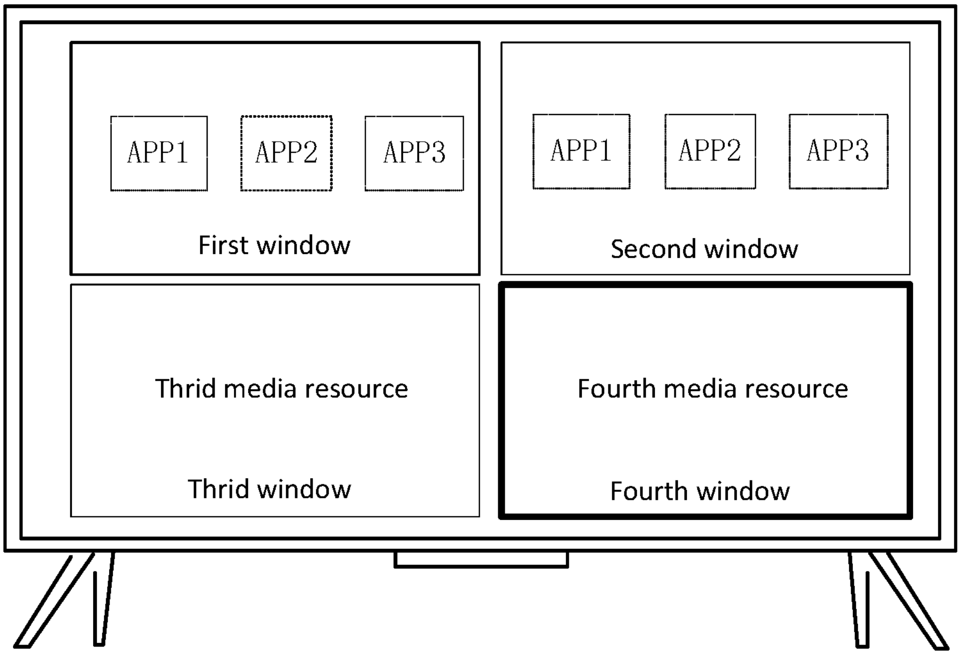
FIG. 5D is a schematic diagram of a display effect of a window switch in a split-screen mode according to some embodiments.

In some embodiments, after the processor 250 receives the selection instruction sent from the user, the processor 250 calculates the target window selected by the user, places the target window on the topmost layer of the display 260, and moves the focus to the target window, so that the target window is marked as the second state. FIG. 5D is a schematic diagram of a display effect of switching a window in a split-screen mode according to some embodiments. As shown in FIG. 5D, the window in the current first state is the first window. If the user wants to operate the media resources in the fourth window, the user sends selection instruction(s) of "rightward" and then "downward" through the remote control according to the relative position between the fourth window and the first window, to mark the fourth window as the second state, After receiving a confirmation instruction sent from the user, the fourth window is marked as the first state.

In some embodiments, when controlling the focus to move to the target window, the processor 250 marks each window on the path of the focus move as the second state through the second mark, and after the focus is moved to from a window to another window, the processor 250 resets its second state of the window to the third state. That is, in the window switch mode, the window where the focus is located is marked as the second state by a frame. The user may determine the trajectory of the focus move and the current window where the focus is located through the movement of the second mark. Following the above example, in FIG. 5D, when the user sends the selection instruction of "rightward" through the remote control, the processor controls the focus to move to the second window, and at this time, the second window is marked as the second state through the focus frame of the thin green line. When receiving the selection instruction "downward" sent from the user through the remote control, the focus is moved to the fourth window, and the fourth window is marked as the second state through the focus frame of the thin green line, and meanwhile, the second window is reset to the third state, that is, the marking of the second mark for the second window is canceled for the second window.

In some embodiments, after the window selected by the user is marked as the second state according to the user's selection instruction, and after receiving the confirmation instruction sent from the user, the window in the second state is marked as the first state, and correspondingly, the second mark of the window is replaced with the first mark, for example, the marking of the focus frame of the green thin line for the window is changed to the focus frame of the red thick line for the window. The confirmation instruction may be sent from the user through a "Confirm" button on the remote control. The confirmation instruction may also be sent from the user through voice control, for example, after the user inputs wake-up words into the display apparatus, the user continues to input "confirm current selection" to the display apparatus 200. The process of controlling the focus to move among the multiple windows according to the user's instruction has been described above. Of course, after selecting the window in the first state, the user may also control the focus to move within the window.

In some embodiments, when the display apparatus 200 is in the split-screen mode, the display apparatus 200 receives a selection instruction input from the user, and according to the selection instruction, controls the focus to move among various controls of applications in the window in the first state. Each application control among one or more application controls on the path of the focus move is marked as a focus application by changing the background color of that application. When the user wants to control an application in the window in the current first state, the user may send selection instructions through the directional buttons, such as "up, down, left, right" buttons, on the remote control, and then cause an application control or icon to be selected, and the selected application corresponding to the application control or icon may be indicated by a darkened background color to indicate that the current application is selected.

In order to further explain the foregoing multi-window switching process, some embodiments of the present application further provide a method for user interface processing. The method includes: the processor 250 receives a command for triggering a window switch mode from a user, and when the user interface presented on the display includes multiple windows, marks a first window in the first state as the second state according to the command. The processor 250 further receives a selection instruction for selecting a window, marks the window selected by the user as the second state according to the selection instruction, and marks the first window from the second state to the third state, where, the third state refers to a state without focus. Finally, the processor 250 receives the confirmation instruction from the user, and marks the window in the second state as the first state according to the confirmation instruction.

The method for user interface processing will be further described below with reference to the accompanying drawings.

Figure 22:
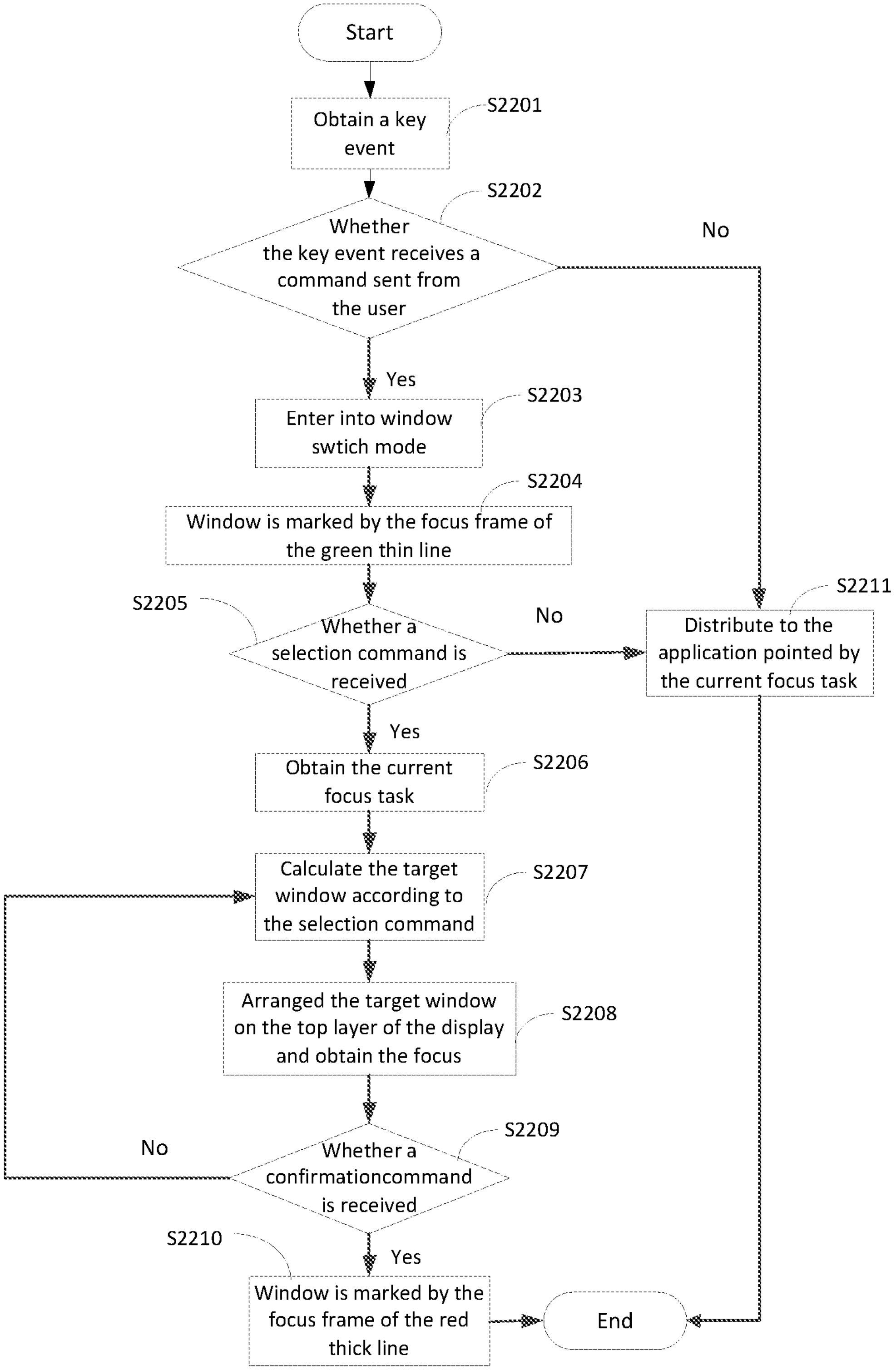
FIG. 22 is a schematic diagram of a focus move flow for switching a window in a split-screen mode according to some embodiments.

FIG. 22 is a schematic diagram of a focus move flow for switching a window in a split-screen mode according to some embodiments. As shown in FIG. 22, in some embodiments, the display apparatus 200 firstly receives a key value, that is, obtains a key event (S2201). Then, the processor 250 determines whether the key event receives a command sent from the user (S2202). If it is a command, the display apparatus 200 is caused to enter into window swtich mode (S2203), that is, the window in the current first state is marked as the second state, the window marked by the focus frame of the red thick line is changed to the window marked by the focus frame of the green thin line (S2204), and further the display apparatus 200 waits for the user to make a selection. Determine whether the selection command is received (S2205). If the selection instruction is received, obtain the current focus task (S2206), and calculate the target window according to the selection command (S2207); arranged the target window on the top layer of the display and obtain the focus (S2208); determine whether the confirmation command is received (S2209), if so, the window is marked by the focus frame of the red thick line (S2210); if not, execute S2207 again. If the selection command is not received, the key event is directly distributed to the application pointed by the current focus task (S2211). If it is not the command, the key event is directly distributed to the application pointed by the current focus task (S2211). Then, when the selection instruction sent from the user is received, the current focus task is obtained, that is, the window where the current focus is located is found. After the position of the current focus is obtained, the target window is calculated according to the selection instruction sent from the user. Finally, the target window is placed on the top layer, and the focus is obtained, that is, the target window is marked as the first state.

In some embodiments, the windows in the first state and the second state are marked by the first mark and the second mark, respectively, where the first mark and the second mark are focus frames with different forms.

In some embodiments, marking the first window in the first state as the second state according to the command includes: moving the focus between the multiple windows according to the command; replacing the first mark of the first window with the second mark.

In some embodiments, the first mark is displayed when the user operates the content displayed in the window in the first state; and the first mark is hidden when the user does not operate the content displayed in the window in the first state.

In some embodiments, marking the corresponding window to the second state according to the selection instruction includes: determining a target window according to the selection instruction; placing the target window on the topmost layer of the display; and controlling the focus to move to the target window, and marking the target window as the second state.

In some embodiments, a first window among one or more windows on the path of the focus move is marked as the second state by the second mark, and after the focus is moved from the first window to another window, the second state of the first window is reset to the third state.

In some embodiments, when the user interface includes multiple windows, a selection instruction from the user is received; according to the selection instruction, the focus is controlled to transfer among the respective controls of the applications in the window in the first state.

A data interaction process in the stage of the split-screen mode of the display apparatus according to the embodiments of the present application will be explained with reference to the accompanying drawings.

Figure 23:
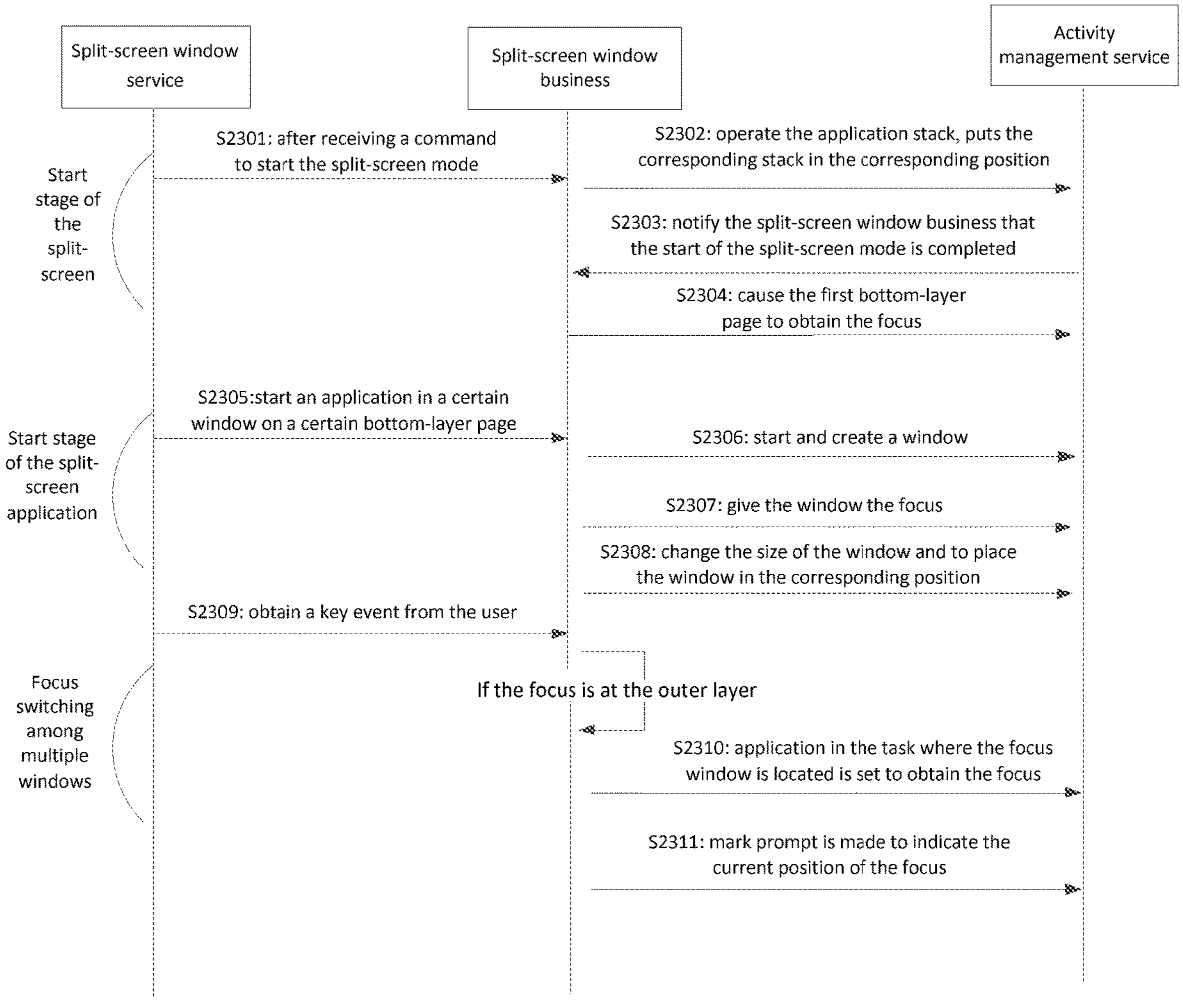
FIG. 23 is a timing diagram during a split screen mode according to some embodiments.

FIG. 23 is a timing diagram when a display apparatus in a split screen mode according to some embodiments. In some embodiments, as shown in FIG. 23, the display apparatus 200 implements split-screen mode based on the data interaction among the split-screen window service (SplitWindowService), the split-screen window business (HSSplitWindowUsercase) and the Activity management service (ActivityManagerService). First of all, for start stage of the split-screen, after receiving a command to start the split-screen mode (S2301), the split-screen window service controls the split-screen window business to start the split-screen mode by calling the split-screen startup interface. The split-screen window business operates the application stack, puts the corresponding stack in the corresponding position (S2302), the activity management service notifies the split-screen window business that the start of the split-screen mode is completed (S2303), and the split-screen window service causes the first bottom-layer page to obtain the focus (S2304), that is, sets the window that obtains the focus by default. For example, the split-screen window business operates on the stack at this time. If it is a three-split screen in the split-screen mode, three stacks are activated through the activity management service and arranged in sequence in the display order. The activity management service notifies the split-screen window business through callbacks that the start of the split-screen is completed, and the page where the first bottom-layer task is located obtains the focus. Then in the start stage of the split-screen application, the user clicks a window on a certain bottom-layer page, that is, starts an application in a certain window on a certain bottom-layer page (S2305), and the split-screen window service starts and creates a window through the activity management service (S2306), and moves the focus to the window, and gives the window the focus (S2307). Since the display interface is 1080P by default, it is necessary to adjust the size of the window, that is, reduce the size of the window proportionally, and change the size of the window by setting the position, width and height. That is, it is to change the size of the window to 1080P and to place the window in the corresponding position (S2308). Finally, for focus switching among multiple windows, the split-screen window service obtains a key event from the user (S2309), and when receiving a command, causes the display apparatus 200 to enter into window switch mode. At this time, the split-screen window business sets the focus to the outer layer, that is, selects the task where the window is located, and marks the current mode as the window switch mode. When a window is selected, the split-screen window business provides a mark prompt for the selected window to indicate the position of the current focus. After the user presses a confirm key, the application in the task where the focus window is located is set to obtain the focus (S2310), and a mark prompt is made to indicate the current position of the focus (S2311).

When the display apparatus 200 is in the window switch mode, that is, when the focus moves between multiple windows, a window in the framework layer obtains window information, where the window information includes position, task, etc., and the activity of the framework layer responds to an operation of the key. The key movement needs to be processed, at this time, the focus which is moved is a focus between outer windows, not a focus on application controls or icons in the window. When the window in the first state is selected, the focus is moved into the window, that is, the user can move the focus on the application controls or icons in the window. At this time, the window, position, and activity of the framework layer are involved, and the key is first distributed to the current window, and then distributed to a particular application. When moving up, down, left, and right, the position of the control focus among the applications is moved.

In the present application, when the smart TV is in the split-screen mode, the user can realize the focus switching process between different windows, and freely operate and click any application in any window, which greatly improves user's experience.

For the convenience of explanation, the above description has been made in combination with specific embodiments. However, the above discussion in some embodiments is not intended to be exhaustive or to limit implementations to the specific forms disclosed above. Numerous modifications and variations are possible in light of the above teachings. The above embodiments have been chosen and described to better explain the principles and practical applications, so as to enable those skilled in the art to better utilize the embodiments and various modified embodiments suitable for specific use considerations.

What is claimed is:

1. A display apparatus, comprising:

at least one processor, connected with the display, and configured to execute instructions to cause the display apparatus to:

a display, configured to display images and/or a user interface, wherein the user interface comprises one or more windows;

establish a connection with a first projection device in response to a first projection request from the first projection device;

receive projection content from the first projection device;

based on determining projection content from the first projection device is vertical media resource, control the display to show a top-level application of a user interface displayed when the first projection request is received and the projection contents from the first projection device;

based on determining the top-level application supports split screen display, display two windows on the display, wherein the top-level application is displayed in a first window of the two windows, and the projection content from the first projection device is displayed in a second window of the two windows; and based on determining the top-level application does not support split screen display, display two windows on the display, wherein the top level application after scaling is displayed in either window of the two windows, and the projection content from the first projection device is displayed in the other window of the two windows;

establish connections with multiple projection devices in response to multiple projection requests from the multiple projection devices, wherein the multiple projection devices support a same projection protocol, and the multiple projection devices are connected with the display apparatus at different time points;

receive projection contents sent from the multiple projection devices;

based on determining the projection contents from a second projection device is vertical media resource, control multiple windows to display the projection contents sent from the multiple projection devices respectively, wherein the second projection device is connected with the display apparatus later than one or more other projection devices among the multiple projection devices; and based on determining the projection content sent from the second projection device is a horizontal media resource, control the display to display the projection contents sent from the second projection device in full screen.

2. The display apparatus according to claim 1, wherein the at least one processor is further configured to execute the instructions to cause the display apparatus to:

based on determining the display comprises one window, display the projection content from the second projection device in full screen.

3. The display apparatus according to claim 1, wherein, in a case where the display apparatus establishes the connections with the multiple projection devices, the at least one processor is further configured to execute the instructions to cause the display apparatus to:

receive multiple projection requests from the multiple projection devices through a same projection service in the display apparatus;

in response to the multiple projection requests, monitor the connections of the projection devices by using the projection service, and perform group management on the multiple projection devices, wherein different projection devices are different members in a group; and create instruction channels and data channels between the multiple projection devices and the members in the group, wherein the instruction channels are configured for instruction interactions between the multiple projection devices and the display apparatus, and the data channels are configured for data interactions between the multiple projection devices and the display apparatus.

4. The display apparatus according to claim 3, wherein the at least one processor is further configured to execute the instructions to cause the display apparatus to:

associate the multiple projection devices with multiple device identifiers;

wherein a projection device has a unique device identifier in the group.

5. The display apparatus according to claim 1, wherein, in a case where the multiple windows display the projection contents sent from the multiple projection devices respectively, the at least one processor is further configured to execute the instructions to cause the display apparatus to:

based on determining the display content of the top-level application is retained, control the multiple windows to display a display content of the top-level application and the projection contents sent from the multiple projection devices respectively; and based on determining the display content of the top-level application is not retained, control the multiple windows to display the projection contents sent from the multiple projection devices respectively.

6. The display apparatus according to claim 5, wherein the at least one processor is further configured to execute the instructions to cause the display apparatus to:

based on determining the top-level application supports split-screen displaying, activate a corresponding number of windows, and push the top-level application and the projection contents from the multiple projection devices respectively to the corresponding number of windows through an activity manager; and based on determining the top-level application does not support split-screen displaying, activate a corresponding number of windows, and push a proportionally reduced user interface of the top-level application and the projection contents sent from the multiple projection devices respectively to the corresponding number of windows through an activity manager.

7. The display apparatus according to claim 1, wherein, in a case where the multiple windows display the projection contents of the multiple projection devices respectively, the at least one processor is further configured to execute the instructions to cause the display apparatus to:

receive an selection operation on a media resource control in one of the multiple windows, wherein the media resource control is configured to display a corresponding multimedia resource; and display the corresponding multimedia resource in the window to which the media resource control belongs in full screen according to the selection operation, in a case where the corresponding multimedia resource is a horizontal media resource.

8. A method for a display apparatus, comprising:

a display, configured to display images and/or a user interface, wherein the user interface comprises one or more windows;

establishing a connection with a first projection device in response to a first projection request from the first projection device;

receiving projection content from the first projection device;

based on determining projection content from the first projection device is vertical media resource, controlling the display to show a top-level application of a user interface displayed when the first projection request is received and the projection contents from the first projection device;

based on determining the top-level application supports split screen display, displaying two windows on the display, wherein the top-level application is displayed in a first window of the two windows, and the projection content from the first projection device is displayed in a second window of the two windows;

based on determining the top-level application does not support split screen display, displaying two windows on the display, wherein the top level application after scaling is displayed in either window of the two windows, and the projection content from the first projection device is displayed in the other window of the two windows;

establishing connections with multiple projection devices in response to multiple projection requests from the multiple projection devices, wherein the multiple projection devices support a same projection protocol, and the multiple projection devices are connected with the display apparatus at different time points;

receiving projection contents sent from the multiple projection devices;

based on determining the projection contents from a second projection device is vertical media resource, controlling multiple windows to display the projection contents sent from the multiple projection devices respectively, wherein the second projection device is connected with the display apparatus later than one or more other projection devices among the multiple projection devices; and based on determining the projection content sent from the second projection device is a horizontal media resource, controlling the display to display the projection contents sent from the second projection device in full screen.

9. The method according to claim 8, further comprising:

based on determining the display comprises one window, displaying the projection content from the second projection device in full screen.

10. The method according to claim 8, further comprising:

receiving multiple projection requests from the multiple projection devices through a same projection service in the display apparatus;

in response to the multiple projection requests, monitoring the connections of the projection devices by using the projection service, and perform group management on the multiple projection devices, wherein different projection devices are different members in a group; and creating instruction channels and data channels between the multiple projection devices and the members in the group, wherein the instruction channels are configured for instruction interactions between the multiple projection devices and the display apparatus, and the data channels are configured for data interactions between the multiple projection devices and the display apparatus.

11. The method according to claim 10, further comprising:

associating the multiple projection devices with multiple device identifiers;

wherein a projection device has a unique device identifier in the group.

12. The method according to claim 8, further comprising:

based on determining the display content of the top-level application is retained, controlling the multiple windows to display a display content of the top-level application and the projection contents sent from the multiple projection devices respectively; and based on determining the display content of the top-level application is not retained, controlling the multiple windows to display the projection contents sent from the multiple projection devices respectively.

13. The method according to claim 12, further comprising:

based on determining the top-level application supports split-screen displaying, activating a corresponding number of windows, and pushing the top-level application and the projection contents from the multiple projection devices respectively to the corresponding number of windows through an activity manager; and based on determining the top-level application does not support split-screen displaying, activating a corresponding number of windows, and pushing a proportionally reduced user interface of the top-level application and the projection contents sent from the multiple projection devices respectively to the corresponding number of windows through an activity manager.

14. The method according to claim 8, further comprising:

receiving an selection operation on a media resource control in one of the multiple windows, wherein the media resource control is configured to display a corresponding multimedia resource; and displaying the corresponding multimedia resource in the window to which the media resource control belongs in full screen according to the selection operation, in a case where the corresponding multimedia resource is a horizontal media resource.

* * * * *